US012763341B2

(12) United States Patent
Seki et al.

(10) Patent No.: US 12,763,341 B2
(45) Date of Patent: Oct. 13, 2026

(54) CATALYST FOR ELECTRODES, COMPOSITION FOR FORMING GAS DIFFUSION ELECTRODE, GAS DIFFUSION ELECTRODE, MEMBRANE ELECTRODE ASSEMBLY, AND FUEL CELL STACK

(71) Applicant: N.E. CHEMCAT CORPORATION, Tokyo (JP)

(72) Inventors: Yasuhiro Seki, Tokyo (JP); Tomoteru Mizusaki, Tokyo (JP); Kiyotaka Nagamori, Tokyo (JP); Satoshi Aoki, Tokyo (JP); Makoto Nishibetto, Tokyo (JP); Yoshiyuki Wada, Tokyo (JP); Yoko Nakamura, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 721 days.

(21) Appl. No.: 18/026,553

(22) PCT Filed: Sep. 28, 2021

(86) PCT No.: PCT/JP2021/035650

§ 371 (c)(1),
(2) Date: Mar. 15, 2023

(87) PCT Pub. No.: WO2022/071320

PCT Pub. Date: Apr. 7, 2022

(65) Prior Publication Data

US 2023/0335760 A1 Oct. 19, 2023

(30) Foreign Application Priority Data

Sep. 29, 2020 (JP) ................................ 2020-163683
Oct. 14, 2020 (JP) ................................ 2020-173467

(51) Int. Cl.
*H01M 4/92* (2006.01)
*H01M 4/86* (2006.01)
*H01M 8/1004* (2016.01)

(52) U.S. Cl.
CPC ......... *H01M 4/926* (2013.01); *H01M 4/8605* (2013.01); *H01M 4/921* (2013.01); *H01M 8/1004* (2013.01)

(58) Field of Classification Search
CPC .... H01M 4/926; H01M 4/8605; H01M 4/921; H01M 8/1004; H01M 2008/1095;
(Continued)

(56) References Cited

U.S. PATENT DOCUMENTS

2007/0031722 A1 2/2007 Adzic et al.
2014/0287344 A1 9/2014 Suzue et al.
(Continued)

FOREIGN PATENT DOCUMENTS

JP 2003109608 A * 4/2003
JP 2013-109856 A 6/2013
(Continued)

OTHER PUBLICATIONS

Huang et al., On the nature of platinum oxides on carbon-supported catalysts, 2014, J. Electroanalytical Chemistry, 728, 112-117 (Year: 2014).*

(Continued)

*Primary Examiner* — Daniel S Gatewood
(74) *Attorney, Agent, or Firm* — WHDA, LLP

(57) ABSTRACT

This catalyst for electrodes comprises: a porous carbon support which has nanopores having a pore diameter of from 1 nm to 20 nm; and a plurality of catalyst particles which are supported by the support. The catalyst particles contain Pt (zerovalent), and are supported by both inner portions and outer portions of the nanopores of the support. If an analysis of the particle size distribution of the catalyst particles is performed using three-dimensional reconstructed images obtained through a STEM-based electron tomography measurement, the proportion of the catalyst particles supported by the inner portions of the nanoparticles is 50% or more; at least one nanopore is formed in a cubic image having a side of from 20 nm to 50 nm, said cubic image being obtained from a three-dimensional reconstructed image of a catalyst (Continued)

aggregate; and this nanopore has the shape of a continuously extending interconnected pore.

20 Claims, 18 Drawing Sheets

(58) Field of Classification Search
CPC ............. H01M 4/96; B22F 9/24; B22F 1/054; B22F 1/18; C22C 1/0466; B01J 37/16; B01J 21/18; B01J 23/42; B01J 35/60; Y02E 60/50
See application file for complete search history.

(56) References Cited

U.S. PATENT DOCUMENTS

| | | | | |
|---|---|---|---|---|
| 2016/0072134 | A1* | 3/2016 | Ohma ................. | H01M 4/9083 429/523 |
| 2016/0087281 | A1 | 3/2016 | Mashio et al. | |
| 2017/0338495 | A1 | 11/2017 | Horiuchi et al. | |
| 2020/0127299 | A1 | 4/2020 | Shintani et al. | |
| 2021/0184228 | A1 | 6/2021 | Nagamori et al. | |

FOREIGN PATENT DOCUMENTS

| | | | |
|---|---|---|---|
| JP | 2019-192501 | A | 10/2019 |
| JP | 2020-64852 | A | 4/2020 |
| JP | 2021-99270 | A | 7/2021 |
| WO | 2014/175098 | A1 | 10/2014 |
| WO | 2016/063968 | A1 | 4/2016 |
| WO | 2019/221168 | A1 | 11/2019 |

OTHER PUBLICATIONS

International Search Report dated Nov. 30, 2021, issued in counterpart International Application No. PCT/JP2021/035650 (2 pages).
Ott et al., "Ionomer distribution control in porous carbon-supported catalyst layers for high-power and low Pt-loaded proton exchange membrane fuel cells", Nature Materials, Jan. 2020, vol. 19, pp. 77-85, cited in Specification (10 pages).
Park et al., "Effects of carbon supports on Pt distribution, ionomer coverage and cathode performance for polymer electrolyte fuel cells", Journal of Power Sources, 2016, vol. 315, pp. 179-191, cited in Specification (13 pages).

* cited by examiner

Example 1

Example 2

Example 2

Particle diameter distribution of catalyst particles (inside nanopore)

Example 2

Particle diameter distribution of catalyst particles (outside nanopore)

Comparative Example 1

CATALYST FOR ELECTRODES, COMPOSITION FOR FORMING GAS DIFFUSION ELECTRODE, GAS DIFFUSION ELECTRODE, MEMBRANE ELECTRODE ASSEMBLY, AND FUEL CELL STACK

TECHNICAL FIELD

The present invention relates to a catalyst for electrode having a porous carbon as a support. More particularly, the present invention relates to a catalyst for electrode suitably used for a gas diffusion electrode, and more particularly, to a catalyst for electrode suitably used for a gas diffusion electrode of a fuel cell.

Further, the present invention relates to a composition for forming gas diffusion electrode, a membrane-electrode assembly, and a fuel cell stack comprising the above-described catalyst for electrode particles.

BACKGROUND ART

Polymer electrolyte fuel cells (Polymer Electrolyte Fuel Cell: hereinafter referred to as "PEFC" as required) are being researched and developed as power sources for fuel cell vehicles and household cogeneration systems.

A noble metal catalyst composed of noble metal particles of a platinum group element such as platinum (Pt) is used for a catalyst used for a gas diffusion electrode of a PEFC.

For example, as a typical conventional catalyst, a "Pt supported carbon catalyst" (hereinafter, referred to as "Pt/C catalyst" as needed) is known which is a powder of catalyst particles in which Pt fine particles are supported on conductive carbon powder.

Among the production cost of PEFC, the ratio of the cost occupied by noble metal catalysts such as Pt is large, which has become a problem toward the cost reduction of PEFC and the popularization of PEFC.

Among these research and development, in order to reduce the amount of platinum used, conventionally, a powder of catalyst particles (hereinafter, referred to as "core-shell catalyst particles" if necessary) having a core-shell structure formed of a core portion made of a non-platinum element and a shell portion made of Pt (hereinafter, referred to as "core-shell catalyst particles") has been studied, and a large number of reports have been made.

For example, Patent Document 1 discloses a particle composite (corresponding to the core-shell catalyst particles) having a structure in which palladium (Pd) or a Pd alloy (corresponding to the core portion) is coated by an atomic thin layer of Pt atoms (corresponding to the shell portion). Further, in Patent Document 1, there is described as an example, a core-shell catalyst particle having a structure in which the core portion is Pd particles and the shell portion is a layer comprising Pt.

On the other hand, as a support of a catalyst for electrode, there are porous carbon having many pores inside the primary particle and solid carbon having fewer pores inside the primary particle compared with the porous carbon, and studies have been made for improving performance utilizing the respective characteristics thereof.

For example, Patent Document 2 discloses an example of an investigation in which porous carbon is adopted as a support. In addition, Patent Document 3 discloses an example of an investigation in which solid carbon is adopted as a support. For example, in Patent Document 2, as shown in FIG. 10, as to a porous support (porous carbon) 220 having an average particle size of 20 to 100 nm, there is disclosed a configuration of a catalyst for electrode 200 in which a vacancy volume and a mode diameter of the vacancy distribution of a vacancy P220 having a vacancy diameter of 4 to 20 nm are controlled in predetermined ranges, and a catalyst particle 230 is supported in a primary vacancy P220 of the support 220.

In Patent Document 2, it is mentioned that, thereby, adsorption of the polymer electrolyte on the surface of the catalyst particles 230 existing in the primary vacancy P220 is prevented, and the gas transportability can be sufficiently secured while preventing the effective reaction surface area of the catalyst from being lowered. As a result, it has been mentioned that a catalyst layer for a fuel cell exhibiting excellent power generation performance can be provided in which the activity per catalyst weight is improved even when the amount of catalyst is reduced.

Further, for example, Patent Document 3 discloses a catalyst (PtCo/C catalyst) for electrode for a fuel cell having a solid carbon support and a catalyst particle containing an alloy of platinum and cobalt supported on the support. The catalyst for electrode has a molar ratio of platinum to cobalt of 4 to 11:1 in the alloy and is acid treated at 70 to 90° C.

In Patent Document 3, when a PtCo alloy is supported on a porous carbon support, a part of PtCo alloy is encompassed inside the porous carbon support, and even if an acid treatment for suppressing elution of Co is performed, it is difficult to sufficiently treat PtCo alloy present inside the support, and as a result, Co is easily eluted from PtCo alloy present inside the support, and it has been viewed as a problem.

Therefore, in Patent Document 3, it is mentioned that, by using a solid carbon support instead of a porous carbon support, it is possible to avoid inclusion of a PtCo alloy inside the support. In addition, thus, it is disclosed that it becomes possible to sufficiently acid-treated the PtCo alloy and to suppress the elution of Co. It is mentioned that it is possible to balance both the initial performance and durability performance of the fuel cell, as a result.

Here, in Patent Document 3, the solid carbon is defined as follows. Namely, it is referred in Patent Document 3 that the solid carbon is a carbon having fewer voids inside carbon as compared with a porous carbon, and specifically, a carbon in which a ratio (t-Pot surface area/BET surface area) of BET surface area determined by N2 adsorption to outer surface area by t-Pot (surface area outside particle was calculated from particle size) is 40% or more.

Note that the "t-Pot surface area" described in Patent Document 3 is understood to indicate, for example, "t-plot (t-plot) surface area" described in the technical report "Analysis of Micropore Surface Area by t-plot Method" published on the internet by "MCEvatec Co., Ltd" on Feb. 1, 2019. The analysis of the micropore surface area by t-plot method is one of the methods to analyze from the adsorption isotherm (adsorption temperature: 77K) of nitrogen. This method is a method to compare and convert the data of adsorption isotherm with the standard isotherm, and to graph the relationship between thickness t of adsorption layer and adsorption amount. In addition to the fact that the specific surface area can be separated into the inside and the outside of the pores and quantified, the tendency of the pores can be known from the shape of the graph.

Examples of the solid carbon include, for example, the carbon described in Japanese Patent No. 4362116, and specifically, it is disclosed that Denkablack (registered trademark) manufactured by Electrochemical Industry Co., Ltd. may be exemplified.

Furthermore, Patent Document 4 discloses a catalyst for electrode (core-shell catalyst) where the catalyst particles are supported both inside and outside the mesopores of the porous carbon support {more specifically, the nanopores formed in the primary particles of the porous carbon support}. This catalyst for electrode has a structure that a ratio of the catalyst particles supported inside the mesopore (more specifically, the nanopores formed in the primary particles of the porous carbon support) is 50% or more when an analysis of a particle size distribution of the catalyst particles is performed by using a three-dimensional reconstructed image obtained by an electron beam tomography measurement using an STEM (scanning transmission electron microscopy).

Here, in the present specification, as described later, the "nanopore" of the porous carbon support means a pore having a pore size of 1 to 20 nm.

In Non-Patent Document 1 and Non-Patent Document 2 mentioned below, with respect to the catalyst particles supported on the porous carbon support, there is disclosed that the ratio of the catalyst particles supported inside the pores (nanopore described above) and the ratio of the catalyst particles supported on the outside of the {nanopore described above} are analyzed by a method different from that of Patent Document 4 described above.

More specifically, in Non-Patent Document 1, Strasser et al. of a group of Berlin Institute of Technology, with respect to the Pt/C catalyst in which Pt catalyst particles are highly dispersed on the commercially available porous carbon (trade name: "Ketjenblack EC-300J", manufactured by Akzo Nobel, specific surface area: about 839 $m^2g^{-1}$), report the results of simultaneous imaging of SEM (Scanning Electron Microscopy) images and TSEM (Transmission SEM) images of the specific Pt/C catalyst particles of interest in the same measurement area. is doing. For example, see Table 1, FIG. 2 and the right column of P.79 of Non-Patent Document 1.

In their method, the SEM image provides information on the Pt catalyst particles present only on the observed portion (one outer surface) of the outer surface of the porous carbon support particles. That is, information on the number of particles of the catalyst particles supported on the outside of the nanopores of the porous carbon support particles can be obtained. On the other hand, from the TSEM image (transmission image), information on all the catalyst particles supported on the outside and the inside of the porous carbon support particles (the above-mentioned primary particles) in the observed Pt catalyst particles can be obtained. Then, from the information from the TSEM image and the information from the SEM image, among the Pt catalyst particles supported on the porous carbon support particles, they tried the attempt to distinguish the Pt catalyst particles supported on the outer surface (outside the nanopores) from the Pt catalyst particles supported on the inside.

Here, in Non-Patent Document 1, as to the SEM images, they do not carry out the measurement of "the back surface on the opposite side" with respect to the observed portion ("outer surface on one side") of the outer surface (outside of the nanopores) of the porous carbon support particles. They assume that the state of the "outer surface on one side" and the state of the "back surface on the other side" are the same. That is, it is assumed that the number of particles of the catalyst particles supported on the "outer surface on one side" and the number of particles of the catalyst particles supported on the "back surface on the opposite side" are the same.

Next, in Non-Patent Document 2, Mr. Uchida et al. of a group at Yamanashi University report the results of photographing a Pt/C catalyst in which Pt catalyst particles are highly dispersed on the commercially available porous carbon (Product name: "Ketjenblack", manufactured by Ketjen Black International, specific surface area: approx. 875 $m^2g^{-1}$), by using STEM (Scanning Transmission Electron Microscope) device capable of photographing SEM images and TEM (transmission electron microscopy) images of Pt catalyst particles. For example, see FIG. 1, Table 2 and the lower right column of P.181 of Non-Patent Document 2.

First, they obtain information on the number of particles of all Pt catalyst particles supported on the porous carbon support particles from the TEM image of the catalyst particles of the specific Pt/C catalyst of interest. Next, they obtain information on the number of Pt catalyst particles present only on the back surface of the porous carbon support particles from the measurement of the SEM image of the same Pt/C catalyst particles as those taken by the TEM image. Next, they use a special 3D sample holder to rotate the specific Pt/C catalyst particle (measuring sample) of interest by exactly 180° C., to measure the SEM image of only the back surface of the same Pt/C catalyst particle. Using the information, among the Pt catalyst particles supported on the porous support particles, they tried the attempt to distinguish the Pt catalyst particles supported on the outer surface from the Pt catalyst particles supported on the inside.

They report that the "internal loading ratio"="100×(number of Pt catalyst particles supported inside)/(total number of Pt catalyst particles)" measured by this method of the commercially available 30 wt % Pt/C catalyst (trade name: "TEC10E30E", manufactured by Tanaka Metal Industry Co., Ltd., expressed as "c-Pt/CB," in the specification) is 62%, the internal loading ratio of the commercially available 46 wt % Pt/C catalyst (trade name: "TEC10E50E", Tanaka Metal Industry Co., Ltd, expressed as "Pt/CB" in the specification.) is 50% or more.

As described above, the present inventors recognize that the analysis methods of Non-Patent Document 1 and Non-Patent Document 2 are different from the analysis method of Patent Document 4 in the following points.

That is, the analysis method by electron tomography measurement in Patent Document 4 is a three-dimensional reconstructed method using an electron microscope, in which the same field of view of the sample to be measured of interest (the size of the target sample to be measured is a mass of about 100 to 300 nm in major axis or minor axis; see FIG. 11, FIG. 15 and FIG. 19 described later) is projected from various directions to obtain the electron microscope images, and the images are reconstructed into a stereoscopic image in a computer, and then, a tomogram is prepared using the computer.

On the other hand, the analysis method of Non-Patent Document 1 performs analysis by using two-dimensional images such as an SEM image and a TSEM image obtained by taking a sample to be measured from a specific one direction.

Further, in the analysis method of Non-Patent Document 2, the analysis is performed by using a two-dimensional image such as the SEM image of the sample to be measured taken from two specific directions (the directions of two axes orthogonal to each other obtained by rotating the sample holder by 180° C.) and the TSEM image of the sample to be measured taken from the specific one direction. In these analysis methods of Non-Patent Document 1 and Non-Patent Document 2, the present inventors consider that, for example, when the sample to be measured (catalyst particles for electrodes) has concave and convex portions, among such the catalyst particles, there is a high possibility that there is something that cannot be sufficiently determined whether the supporting position is inside or outside of the porous carbon support.

In the analysis method of Patent Document 4 where a three-dimensional tomographic image (tomogram) of the sample to be measured is used and this can be observed from various reports, the present inventors consider that, with respect to the sample to be measured of interest (the size of the target sample to be measured is a mass of about 100 to 300 nm in major axis or minor axis; see FIG. 11, FIG. 15 and FIG. 19 described later), the supporting position of the catalyst particles contained in the catalyst for electrode is possible to more accurately grasp by virtual confirmation.

The applicant of the present patent application presents the following publications as a publication in which the known inventions described in the above publications are described.

PRIOR ART DOCUMENT

Patent Document

Patent Document 1: US Un-examined Patent Application Publication No. 2007/31722
Patent Document 2: Japanese Un-examined Patent Application Publication No. 2013-109856
Patent Document 3: WO2016/063968
Patent Document 4: WO2019/221168

Non-Patent Document

Non-patent Document 1: Nature Materials Vol 19 (January 2020)77-85
Non-patent Document 2: Journal of Power Sources 315 (2016)179-191

SUMMARY OF THE INVENTION

Problem to be Solved by the Invention

Toward the spread of PEFC, in order to reduce the amount of Pt used and the material cost, further improvement in catalytic activity is required for the catalyst for electrode.

The present inventors have found that, as to the catalyst for electrode such as Pt/C catalyst, there is no report that, when an analysis of a particle size distribution of the catalyst particles is performed by using a three-dimensional reconstructed image obtained by an electron beam tomography measurement using an STEM (scanning transmission electron microscopy), an improved product having a structure in which the catalyst particles are supported more inside than the outside of the nanopore of the primary particles of the porous carbon support could be actually synthesized, and there is still room for improvement.

The present invention was achieved in view of such technical circumstances, and it is an object of the present invention to provide a catalyst for electrode having excellent catalytic activity capable of contributing to cost reduction of PEFC.

Further, it is an object of the present invention to provide a composition for forming gas diffusion electrode, a gas diffusion electrode, a membrane-electrode assembly (MEA), and a fuel cell stack, which include the above-described catalyst for electrode.

Means to Solve the Problems

The present inventors have intensively studied a configuration of a catalyst for electrode in which a large number of catalyst particles of a catalyst for electrode such as Pt/C catalyst are supported in a nanopore of a porous carbon to realize further improvement in catalytic activity.

As a result, it has been found that the catalyst particles are supported on a support so as to satisfy the following conditions, which is effective for improving the catalytic activity, and thus the present invention was completed.

More specifically, the present invention is composed of the following technical matters.

That is, the present invention provides a catalyst for electrode which includes an conductive porous carbon support having a nanopore of a pore size of 1 to 20 nm, and a plurality of catalyst particles supported on the support, wherein a region made of Pt (0 valence) is formed on at least a part of the surface of the catalyst particle, the catalyst particle is supported on both of inside of the nanopore and outside the nanopore of the support, a ratio of the catalyst particles supported inside the nanopore is 50% or more when an analysis of a particle size distribution of the catalyst particles is performed by using a three-dimensional reconstructed image obtained by an electron beam tomography measurement using an STEM (scanning transmission electron microscopy), when focusing on a catalyst aggregate composed of the catalyst particle and the support, which has a size that can be accommodated in a rectangular space with one side of 60 to 300 nm in the three-dimensional reconstructed image of the STEM, and looking at six square cross sections of a stereoscopic image with one side of 20 to 50 nm extracted from the inside region of the catalyst aggregate, at least one nanopore is formed in at least one cross section, and the nanopore formed in at least one of the six square cross sections has at least one opening in contact with a first side of four sides of the square cross section, and at least one opening in contact with a second side of the cross section of the square which is parallel to the first side, and has a shape of an interconnected pore which extends continuously from the opening on the first side to the opening on the second side without blocking.

When the microstructure of the catalyst for electrode is observed by using a three-dimensional reconstructed image of STEM, by satisfying the condition (a) that the ratio of the catalyst particles supported inside the nanopore is 50% or more and the condition (6) that the nanopores are formed to have the shape of the interconnected pores described above, the catalyst for electrode of the present invention can exhibit an excellent catalytic activity capable of contributing to cost reduction of PEFC.

The detailed reason why the catalyst for electrode of the present invention has excellent catalytic activity has not been sufficiently elucidated.

However, the present inventors consider as follows.

Namely, as to the catalyst for electrode of the present invention which has (a) the ratio of the catalyst particles supported inside the nanopore is 50% or more when the microstructure is observed by using a three-dimensional reconstructed image of STEM, there are many catalyst particles having a relatively small particle size with high activity inside the nanopore of the support as compared with a conventional catalyst for electrode.

When using in the catalyst layer of the gas diffusion electrode of PEFC, the catalyst particles supported inside the nanopores of such a support are supported on the support in a state in which these catalyst particles are hardly in direct contact with the polymer electrolyte present in the catalyst layer. Therefore, the catalyst for electrode of the present invention reduces the decrease in catalytic activity due to poisoning of the Pt component and can exhibit an excellent catalytic activity when made into an electrode as compared with a conventional catalyst for electrode. In addition, the catalyst for electrode of the present invention also reduces the dissolution of the Pt component from the catalyst particles.

Furthermore, in the catalyst for electrode of the present invention, from the viewpoint of obtaining the effect of the present invention more reliably, it is preferable that the ratio of the catalyst particles supported inside the nanopore is 70% or more when an analysis of a particle size distribution of the catalyst particles is performed by using a three-dimensional reconstructed image obtained by an electron beam tomography measurement using an STEM (scanning transmission electron microscopy).

Further, in the case that the microstructure is observed with the three-dimensional reconstructed image of STEM, when using in the catalyst layer of the gas diffusion electrode of PEFC, since the catalyst for electrode of the present invention in which (6) the nanopores are so as to be formed to have the shape of the interconnected pores described above has excellent diffusivity of water, protons and reaction gases (hydrogen, oxygen, or air) included therein, the catalyst particles supported inside the nanopore can be easily utilized. Therefore, also from this point of view, the catalyst for electrode of the present invention can exhibit excellent catalytic activity.

Here, in the present invention, the "analysis method of a particle size distribution of the catalyst particles is performed by using a three-dimensional reconstructed image obtained by an electron beam tomography measurement using an STEM (scanning transmission electron microscopy)" is an analysis method (analysis method name: "USAL-KM3D analysis method") using STEM (scanning transmission electron microscope) at UBE Scientific Analysis Center Co., Ltd., in which electron tomography measurement is performed, and the obtained measurement data is subjected to image analysis using an image analysis software ("Avizo" available from FEI).

In the USAL-KM3D analysis method, a sample to be measured to be measured is prepared according to the following procedure and conditions.

<Preparation Method and Conditions of Sample to be Measured>

First, in order to optimally measure the structure of the sample to be measured, the sample to be measure is prepared on the "Cu grid mesh with carbon support film" for TEM observation by the dispersion method, which is a general electron microscope sample preparation method to satisfy the following conditions.

(A) On the grid mesh, there is a mass of powder (catalyst for electrode) to be measured (a mass having a major axis or a minor axis in the range of about 60 to 300 nm, see FIG. 11, FIG. 15 and FIG. 19 described later) so as to be measurable (observable) at an appropriate frequency {the number of particles (the number of observable catalyst particles is 100 or more, preferably 200 or more, more preferably 300 or more, still more preferably 400 or more)}.

(B) When the grid mesh is rotated at a rotation angle of ±80° on its rotation axis, the captured image of the powder mass of the sample to be measured does not overlap with the captured image of the other fine powder mass. If the captured image of the powder mass of the sample to be measured overlaps with the captured image of the other fine powder mass, three-dimensional analysis cannot be performed.

(C) A plurality of powder masses visible in the measurement area are arranged so as to be apart from each other to the extent that 3D tomography observation is possible for the powder masses of the sample to be measured.

<Measurement Conditions>

Nanopores of 1 nm or more among the pores contained in the powder mass of the above-mentioned target sample to be measured (catalyst for electrode) are subjected to the 3D tomography observation under the three-dimensionally visually distinguishable conditions (for example, adjustment of the acceleration voltage of the electron beam) without damaging the powder mass of the measurement target sample (catalyst for electrode).

Furthermore, here, in the present invention, the "nanopore" of the porous carbon support indicates a pore having a pore diameter of 1 to 20 nm, and the "micropore" indicates a pore having a pore diameter of less than 1 nm. Then, in the present invention, the "pore diameter of nanopore" indicates the "size of the inlet of nanopore". The "pore diameter of micropore" indicates the "size of the inlet of micropore".

In the present invention, the "pore diameter (size of the inlet of the pore)" of nanopore indicates the size of the "nanopore inlet" which can be determined by utilizing the three-dimensional reconstructed image obtained by an electron beam tomography measurement using a usual STEM (scanning transmission electron microscopy).

More preferably, the "pore diameter (size of the inlet of the pore)" of nanopore indicates the size of the "nanopore inlet" obtained by the "USAL-KM3D analysis method" described above.

More specifically, the "size of the inlet of nanopore" indicates the diameter of a circle (circle equivalent diameter) having the same area as the area of the inlet obtained from the image of the inlet of the nanopore obtained by the "USAL-KM3D analysis method".

Further, in the present invention, the procedure by using the three-dimensional reconstructed image of STEM for confirming the conditions (8) that the nanopores are formed to have the shape of the interconnected pores described above will be described.

Confirmation of the condition (8) can be performed by using the three-dimensional reconstructed image obtained by the analysis of the catalyst for electrode by the electron beam tomography measurement with a general STEM (scanning transmission electron microscope). However, from the viewpoint of confirming the condition (B) more reliably, it is preferable to use the three-dimensional reconstructed image of STEM obtained in the process of carrying out the aforementioned USAL-KM 3D analysis method.

The procedure for confirming the condition (B) will be described below.

(D) First, a three-dimensional reconstructed image of STEM of the catalyst to be measured is obtained. From among the catalyst aggregates (aggregates composed of catalyst particles and porous carbon supports) in the three-dimensional reconstructed image, a catalyst aggregate which has a size that can be accommodated in a rectangular space with one side of 60 to 300 nm (region of interest) is selected. This procedure can be easily understood, for example, by referring to the stereoscopic images extracted from the 3D-STEM images (three-dimensional reconstructed images) of the catalyst aggregates of the catalysts of Example 1, Example 2, and Comparative Example 2 described later. (See FIG. 24(*a*), FIG. 24(*f*) and FIG. 24(*k*), described later).

(E) Next, a stereoscopic image (20 to 50 nm on one side) is extracted from the inner region of the catalyst aggregate selected in the step (D). This procedure can be easily understood, for example, by referring to the stereoscopic images (three-dimensional reconstructed images of STEM) obtained for the catalyst aggregates of the catalysts of Example 1, Example 2, and Comparative Example 2 described later (FIG. 24(*b*), FIG. 24(*g*) and FIG. 24(*l*), described later).

(F) Next, the stereoscopic image (three-dimensional reconstructed image of STEM) inside the catalyst aggregate obtained in the step (E) is observed, and by utilizing the difference in luminance, the part of the void (part of pore such as nanopore) and the part of the porous carbon support are segmented.

More specifically, this stereoscopic image (three-dimensional reconstructed image of STEM) is composed of divided smaller cubic pixels (voxels). Each pixel (voxel) stores luminance (no unit). Then, by setting an appropriate threshold for the luminance, the analyst clearly segments (binarizes) the part of the void (part of pore such as nanopore) and the part of the porous carbon support in the stereoscopic image (three-dimensional reconstructed image of STEM). When the luminance of a certain pixel (voxel) is above the threshold, it is automatically determined to be a carbon part. Also, if the luminance of a certain pixel (voxel) is less than the threshold value, it is automatically determined to be a void part. This segmentation can be performed by setting the same luminance threshold for all pixels (voxels) included in the same stereoscopic image (three-dimensional reconstructed image of STEM). For different stereoscopic images (three-dimensional reconstructed images of STEM), the analyst sets different luminance thresholds (thresholds suitable for segmentation).

From the viewpoint of performing segmentation more accurately, the size of a pixel (voxel) is preferably a cube with one side of 1 nm or less.

In the present invention, when measuring the porosity of the stereoscopic image (three-dimensional reconstructed image of STEM) of the catalyst aggregate described later, the catalyst particles are regarded as voids during the segmentation.

Further, for the step (F), for example, it can be easily understood by referring to the stereoscopic images extracted from the 3D-STEM images (three-dimensional reconstructed images) of the catalyst aggregates of the catalysts of Example 1, Example 2, and Comparative Example 2 described later. (See FIG. 24(*b*), FIG. 24(*g*) and FIG. 24(1), described later). Furthermore, it can be easily understood by referring to the three cross-sections (three cross-sections after the segmentation) of the stereoscopic images (three-dimensional reconstructed images of STEM) obtained for the catalyst aggregates of the catalysts of Example 1, Example 2, and Comparative Example 2 described later (FIG. 24(*c*), FIG. 24(*d*), FIG. 24(*e*), FIG. 24(*h*), FIG. 24(*i*), FIG. 24(*j*), FIG. 24(*m*), FIG. 24(*n*) and FIG. 24(*o*), described later).

(G) Next, when observing the six square cross-sections of the stereoscopic image (three-dimensional reconstructed image of STEM) after performing segmentation in the step (F), it is confirmed whether or not at least one cross section has at least one of the following shaped nanopore (interconnected pore) is formed.

That is, it is confirmed whether or not the nanopore (interconnected pore) observed in the cross-section of the square of interest has at least one opening in contact with a first side of four sides of the cross section, and at least one opening in contact with a second side which is parallel to the first side. In addition, it is confirmed whether or not the nanopore has a shape of an interconnected pore which extends continuously from the opening on the first side to the opening on the second side without blocking.

For example, referring to Example 1 described later, as shown in FIG. 24, the nanopore P1 observed in the cross section of interest (x-y plane of the square) has two openings in contact with the first side L1 (opening A11 and opening A12). Further, the nanopore P1 has two openings (opening A21 and opening A22) in contact with the second side L2 which is parallel to the first side L1. Furthermore, the nanopore P1 has the shape of interconnected pore that continuously extends from the openings (opening A11 and opening A12) on the first side L1 to the openings (opening A21 and opening A22) on the second side L2 without blocking.

Furthermore, from the viewpoint of obtaining the effects of the present invention more reliably, in the catalyst for electrode of the present invention, it is preferable that the nanopore (interconnected pore) observed in the square cross-section of the stereoscopic image of interest has a shape having a plural of branches P22*a* (see FIG. 25). When using in the catalyst layer of the gas diffusion electrode of PEFC, the catalyst particle supported inside the nanopores like this is easy to be supported on the support in a state in which these catalyst particles are hardly in direct contact with the polymer electrolyte present in the catalyst layer. Further, the nanopore like this has excellent diffusivity of water, protons and reaction gases (hydrogen, oxygen, or air) included therein. Therefore, when the catalyst for electrode having such nanopores is used in the catalyst layer of the gas diffusion electrode of PEFC, the catalyst particle supported inside the nanopore is easy to be utilized for the electrode reaction of PEFC.

Furthermore, from the viewpoint of obtaining the effects of the present invention more reliably, for the same reason as described above, in the catalyst for electrode of the present invention, it is preferable that the nanopore (interconnected pore) observed in the square cross section of the stereoscopic image of interest has two or more openings on the first side (see FIG. 25).

Further, from the viewpoint of obtaining the effects of the present invention more reliably, for the same reason as described above, in the catalyst for electrode of the present invention, it is preferable that the nanopore (interconnected pore) observed in the square cross section of the stereoscopic image of interest has two or more openings on the second side (see FIG. 25).

Furthermore, from the viewpoint of obtaining the effects of the present invention more reliably, for the same reason as described above, in the catalyst for electrode of the present invention, it is preferable that the nanopore (interconnected pore) observed in the square cross section of the stereoscopic image of interest has at least one opening on the third side perpendicular to the first side.

For example, referring to Example 1 described later, as shown in FIG. 25, the nanopore P1 observed in the cross section of interest (x-y plane of the square) has one opening (opening A31) on the third side L3 perpendicular to the first side L1.

Further, from the viewpoint of obtaining the effects of the present invention more reliably, for the same reason as described above, in the catalyst for electrode of the present invention, it is preferable that the nanopore (interconnected pore) observed in the square cross section of the stereoscopic image of interest has at least one opening on the fourth side perpendicular to the first side.

For example, referring to Example 1 described later, as shown in FIG. 25, the nanopore P1 observed in the cross section of interest (x-y plane of the square) has two openings (opening A41 and opening A42) on the fourth side L4 perpendicular to the first side L1.

Furthermore, from the viewpoint of obtaining the effects of the present invention more reliably, in the catalyst for electrode of the present invention, it is preferable that a porosity measured by using the three-dimensional reconstructed image of STEM (stereoscopic image of interest) is 35% or more, more preferably 40% or more, more preferably 45% or more, furthermore preferably 50% or more, furthermore preferably 55% or more, furthermore preferably 60% or more, furthermore preferably 65% or more. On the other hand, from the viewpoint of durability, in the catalyst for electrode of the present invention, it is preferable that a porosity measured by using the three-dimensional reconstructed image of STEM (stereoscopic image of interest) is 80% or less, more preferably 75% or less.

Further, in the catalyst for electrode of the present invention, it is preferable that the porous carbon support contains more nanopores having a pore diameter (size of the inlet of the pore) of 1 to 10 nm among the nanopores. It has been reported that the micellar diameter of the polyelectrolyte used for the anode and cathode catalyst layers of MEA is about 10 nm (for example, Y. S. Kim, et al, DOE Hydrogen Program Merit Review and Peer Meeting FC16, (2009)). Therefore, by using the porous carbon support containing more pores having a pore diameter (size of the inlet of the pore) of 1 to 10 nm, it becomes difficult for the polyelectrolyte to penetrate into the nanopores, and it is more reliably prevented the contact between the catalyst particles supported inside the nanopores and the polyelectrolyte.

Furthermore, in the catalyst for electrode of the present invention, within the range where the effects of the present invention can be obtained, the porous carbon support may further have micropore having a pore diameter of less than 1 nm.

Furthermore, from the viewpoint of obtaining the effect of the present invention more reliably, the porous carbon support is preferably one which can satisfy the above conditions (α) and (β) when used as an catalyst for electrode among "CNovel (manufactured by Toyo Tanso Co., Ltd., product name, registered trademark)" (for example, the porous carbons described in Japanese Patent No. 5636171, Japanese Patent No. 5695147, Japanese Patent No. 5860600, Japanese Patent No. 5860601, Japanese Patent No. 5860602).

CNovel is a porous carbon which has at least nanopores (pore diameter of 1 to 20 nm) and a carbonaceous wall forming the outline of the nanopore; wherein the carbonaceous wall has a portion forming a layered structure, the carbonaceous wall has a three-dimensional network structure, the nanopores are open pores and has the shape of continuous nanopores (the shape of interconnected pores. Referring "interconnected pore P1 where a plural of nanopore P22 are connected in FIG. 2 described later), which has a structure that easily satisfies the above condition (8) when used as a catalyst.

Further, in the catalyst for electrode of the present invention, the catalyst particle may be made of Pt (0 valence).

Furthermore, in the catalyst for electrode of the present invention, the catalyst particle may be made of a Pt alloy. A metal specie other than Pt, which is an element of the alloy is not particularly limited. From the viewpoint of obtaining excellent catalytic activity, it is preferable that the metal species other than Pt, which is an element of the alloy, is at least one metal of Co and Ni.

Further, in the catalyst for electrode of the present invention, the catalyst particle may be a core-shell catalyst particle. In this case, from the viewpoint of obtaining excellent catalytic activity, it is preferable that the core-shell catalyst particle is composed of a core particle and a Pt shell layer (a region composed of Pt (0 valence)) formed on at least a part of the surface of the core particle. The metal specie constituting the core particles is not particularly limited, but at least one of Pd, Ni and Co is preferable from the viewpoint of obtaining excellent catalytic activity. Further, the core particle may be an alloy of at least one of Pd, Ni and Co and other metal. From the viewpoint of reducing the amount of precious metal used, the core particle may contain at least one of a base metal other than precious metal and a base metal oxide, a base metal nitride, and a base metal carbide.

Furthermore, in the catalyst for electrode of the present invention, from the viewpoint of obtaining the effect of the present invention more reliably, it is preferable to satisfy the following equation (1) when an analysis of a particle size distribution of the catalyst particles is performed by using a three-dimensional reconstructed image obtained by an electron beam tomography measurement using an STEM (scanning transmission electron microscopy).

$$(D10/D20) \geq 0.80 \quad (1)$$

Here, in the equation (1), D10 indicates the arithmetic mean value of the sphere-equivalent diameter of the catalyst particles supported on the inside of the nanopores of the support, D20 indicates the arithmetic mean value of the sphere-equivalent diameter of the catalyst particles supported on the outside of the nanopores of the support.

When supporting the catalyst particles on the porous carbon support so as to simultaneously satisfy the condition of the above equation (1), it is possible that the catalyst for electrodes of the present invention more reliably exhibits excellent catalytic activity that can contribute to cost reduction of PEFC.

Here, from the viewpoint of obtaining the effect of the present invention more reliably, it is preferable that the value of (D10/D20) of the above equation (1) is 0.85 or more, more preferably 0.90 or more.

Further, in the catalyst for electrode of the present invention, from the viewpoint of more reliably obtaining the effect of the present invention, when the analysis of the particle size distribution of the catalyst particles is performed by using three-dimensional reconstructed images obtained by electron beam tomography (electron tomography) measurement with an STEM (scanning transmission electron microscopy), it is more preferable that the conditions of the following the equation (2) and the equation (3) are further simultaneously satisfied.

$$D1 \le D2 \quad (2)$$

$$(N1/N2) > 1.0 \quad (3)$$

Here, in the equation (2) and the equation (3), D1 indicates a sphere equivalent diameter of particles exhibiting a maximum frequency (maximum number of particles) among the catalyst particles supported inside the nanopores of the support. In the equation (2) and the equation (3), D2 indicates a sphere equivalent diameter of particles exhibiting a maximum frequency (maximum number of particles) among the catalyst particles supported outside the nanopores of the support.

Further, in the equation (2) and the equation (3), N1 indicates a frequency of particles (number of particles) exhibiting a maximum frequency (maximum number of particles) among the catalyst particles supported inside the nanopores of the support. In the equation (1) and the equation (2), N2 indicates a frequency of particles exhibiting a maximum frequency (maximum number of particles) among the catalyst particles supported outside the nanopores of the support.

By supporting the catalyst particle on the porous carbon support so as to simultaneously satisfy the conditions of the equation (2) and the equation (3) described above, the catalyst for electrode of the present invention can more reliably exhibit an excellent catalytic activity capable of contributing to cost reduction of PEFC.

Further, in the catalyst for electrode of the present invention, at least a region made of Pt (0 valence) is formed on at least a part of the surface of the catalyst particle may be covered with a Pt oxide film as long as the catalyst particles can exhibit excellent catalytic activity.

Further, from the viewpoint of obtaining the effect of the present invention more reliably, in the catalyst for the electrode of the present invention, the BET specific surface area (nitrogen adsorption specific surface area) of the porous carbon support is preferably 200 to 1500 $m^2/g$.

When the catalyst for the electrode is used for the cathode, the BET specific surface area (nitrogen adsorption specific surface area) of the porous carbon support is preferably 700 to 1500 $m^2/g$ from the viewpoint of more reliably obtaining the effect of the present invention, more preferably 750 to 1400 $m^2/g$. Furthermore, when the catalyst for the electrode is used for the cathode from the viewpoint that it is preferable to have a predetermined durability in consideration of the operating environment (temperature fluctuation range, potential fluctuation range) of the cathode, the BET specific surface area (nitrogen adsorption specific surface area) of the porous carbon support is preferably 750 to 900 $m^2/g$.

Further, the present invention provides a powder of the catalyst for electrode containing 10 wt % or more of the above-mentioned catalyst for electrode of the present invention.

In the powder of the catalyst for electrode, the "containing component other than the above-mentioned catalyst for electrode of the present invention" is "the catalyst for electrode other than the above-mentioned catalyst for electrode of the present invention". That is, the powder of the catalyst for electrode of the present invention does not include the powder which does not function as the catalyst for electrode.

Since the powder of the catalyst for electrode of the present invention contains the above-mentioned catalyst for electrode of the present invention, it is possible to exhibit excellent catalytic activity that can contribute to cost reduction of PEFC.

Here, from the viewpoint of more reliably obtaining the effect of the present invention, the content of the above-mentioned catalyst for electrode of the present invention in the powder of the catalyst for electrode of the present invention is preferably 30 wt % or more, more preferably 50 wt % or more, further preferably 70 wt % or more, and most preferably 90 wt % or more.

The powder of the catalyst for electrode of the present invention may contain a catalyst for electrode having the following configuration (for convenience, referred to as "catalyst for electrode P") in addition to the above-mentioned catalyst for electrode of the present invention.

That is, the catalyst for an electrode P has a structure where the catalyst contains a porous carbon support having nanopores of a pore diameter of 1 to 20 nm, and a plurality of catalyst particles supported on the support, the catalyst particles are Pt (0 valent), the catalyst particles are supported both inside the nanopores of the support and outside the nanopores, and when the analysis of the particle size distribution of the catalyst particles by using the above-mentioned "USAL-KM3D analysis method" is carried out, the ratio of the catalyst particles supported on the inside of the nanopores is "less than 50%".

The powder of the catalyst for electrode of the present invention may be composed of the above-mentioned catalyst for electrode of the present invention and the catalyst for electrode P.

Also in this case, from the viewpoint of more reliably obtaining the effect of the present invention, the content of the above-mentioned catalyst for electrode of the present invention in the powder of the catalyst for electrode of the present invention is preferably 30 wt % or more, more preferably 50 wt %, further preferably 70 wt % or more, most preferably 90 wt % or more.

Furthermore, the powder of the catalyst for electrode of the present invention may contain one or more kinds of conductive carbon supports that are different from the porous carbon support of the catalyst for electrode of the present invention, within the range where the effects of the present invention can be obtained. For example, one or more of Ketjen black and acetylene black may be contained. For example, 10 wt % to 100 wt % of different kinds of the conductive carbon supports may be contained with respect to the weight of the porous carbon support of the catalyst for electrode of the present invention.

Further, the present invention provides a gas diffusion electrode containing the above-described catalyst for electrode of the present invention or the powder of the catalyst for electrode of the present invention.

Since the gas diffusion electrode of the present invention includes the catalyst for electrode of the present invention or the powder of the catalyst for electrode of the present invention, it becomes easy to have a configuration having excellent catalytic activity (polarization property) which can contribute to cost reduction of PEFC.

Further, the present invention provides a gas diffusion electrode containing the above-described catalyst for electrode of the present invention or the powder of the catalyst for electrode of the present invention.

The gas diffusion electrode of the present invention includes the catalyst for electrode of the present invention. Therefore, it becomes easy to have a configuration having excellent catalytic activity (polarization property) which can contribute to cost reduction of PEFC.

Furthermore, the present invention provides a membrane-electrode assembly (MEA) including the above-mentioned gas diffusion electrode of the present invention.

Since the membrane-electrode assembly (MEA) of the present invention includes the gas diffusion electrode of the present invention, it becomes easy to have a configuration having a cell property capable of contributing to cost reduction of PEFC.

Further, the present invention provides a fuel cell stack, in which the membrane-electrode assembly (MEA) of the present invention described above is included.

According to the fuel cell stack of the present invention, since the membrane-electrode assembly (MEA) of the present invention is included, it is easy to have a configuration having a cell property capable of contributing to cost reduction of PEFC.

Effects of the Invention

According to the present invention, there is provided a catalyst for electrode having excellent catalytic activity capable of contributing to cost reduction of PEFC.

Further, according to the present invention, there is provided a composition for forming gas diffusion electrode, a gas diffusion electrode, a membrane-electrode assembly (MEA), and a fuel cell stack, each of which includes such a catalyst for electrode.

MODE FOR CARRYING OUT THE INVENTION

Hereinafter, with reference to figures as appropriate, a suitable embodiment of the present invention is explained in detail.

<Membrane-Electrode Assembly (MEA)>

Figure 1:
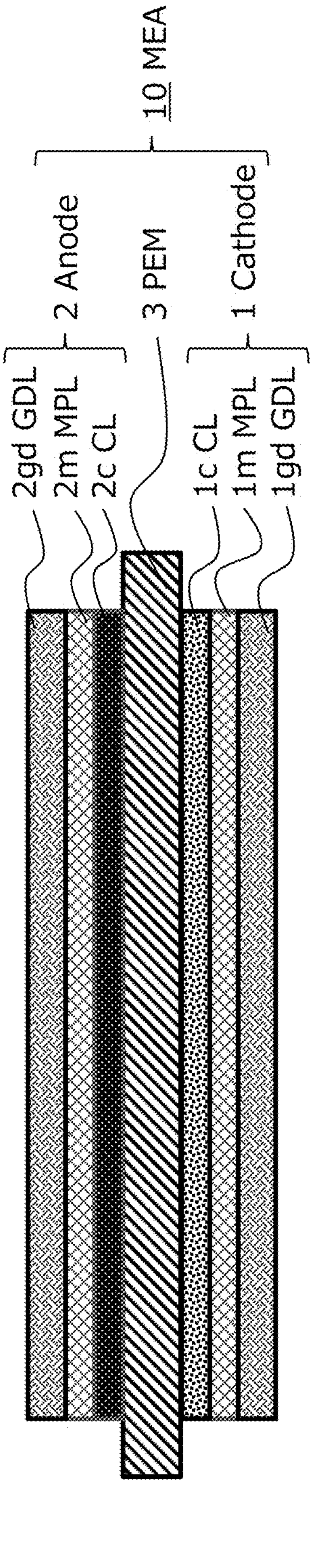
FIG. 1 A schematic cross-sectional view showing a preferred embodiment of the MEA of the present invention.

FIG. 1 is a schematic cross-sectional view showing a preferred embodiment of the MEA of the present invention.

The MEA10 shown in FIG. 1 has the configuration provided with two gas diffusion electrodes (the cathode 1 and the anode 2) having the shape of a plate arranged in the state opposing each other, and the polymer electrolyte membrane (Polymer Electrolyte Membrane, hereinafter referred to as "PEM" if needed) 3 arranged between the cathode 1 and the anode 2.

In this MEA10, at least one of the cathode 1 and the anode 2 has a configuration in which a catalyst for electrode 20 (Pt catalyst 20) to be described later is contained.

The MEA10 can be produced by laminating the cathode 1, the anode 2, and the PEM 3 as shown in FIG. 1 and then applying a pressure to adhere.

<Gas Diffusion Electrode (GDE)>

The cathode 1 as a gas diffusion electrode has a configuration including a gas diffusion layer 1*gd* and a catalyst layer 1*c*, which is formed on the PEM 3 side surface of the gas diffusion layer 1*gd*. Further, the cathode 1 has a water repellent layer (Micro Porous Layer, hereinafter, referred to as "MPL" as needed) 1*m* arranged between the gas diffusion layer 1*gd* and the catalyst layer 1*c*.

Similar to the cathode 1, the anode 2, which is a gas diffusion electrode, has a configuration including a gas diffusion layer 2*gd* and a catalyst layer 2*c*, which is formed on the PEM 3 side surface of the gas diffusion layer 2*gd*, and a MPL 2*m*, which is arranged between the gas diffusion layer 2*gd* and the catalyst layer 2*c*.

(Catalyst Layer (CL))

In the cathode 1, the catalyst layer 1*c* is a layer in which a reaction proceeds such that water is generated from air (oxygen gas) sent from the gas diffusion layer 1*gd* and hydrogen ions moving through the PEM 3 from the anode 2.

In addition, in the anode 2, the catalyst layer 2*c* is a layer in which a reaction in which hydrogen ions and electrons are generated from hydrogen gas sent from the gas diffusion layer 2*gd* proceeds.

At least one of the catalyst layer 1*c* of the cathode 1 and the catalyst layer 2*c* of the anode 2 includes the catalyst for electrode 20 of the present invention.

Preferred Embodiment of the Catalyst for Electrode of the Present Invention

Hereinafter, the preferred embodiment of the catalyst for electrode of the present invention will be described with reference to FIG. 2, FIG. 3, FIG. 24 and FIG. 25.

Figure 2:
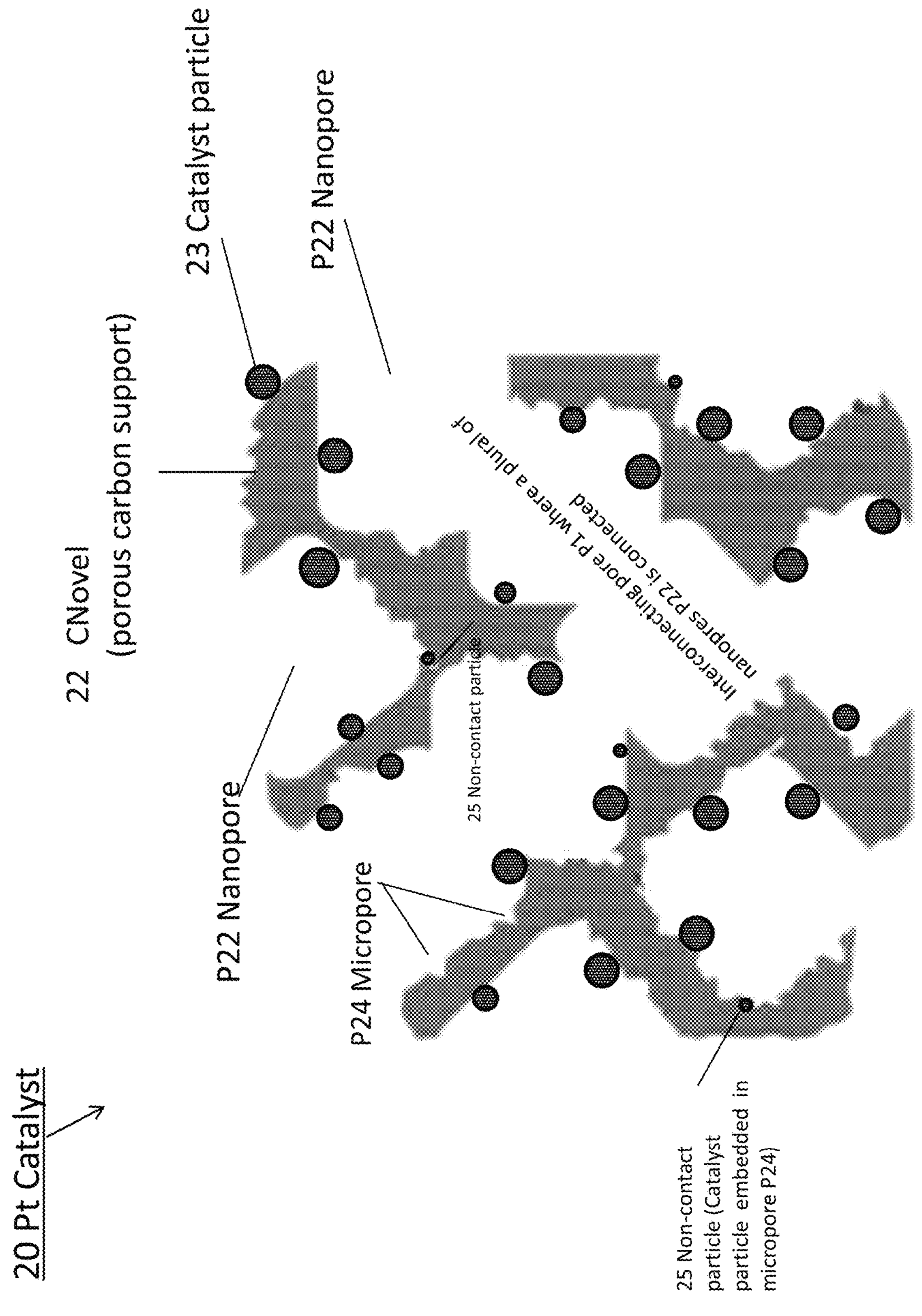
FIG. 2 A schematic cross-sectional view showing a preferred embodiment of the catalyst for electrode of the present invention included in at least one of the cathode catalyst layer and the anode catalyst layer of the MEA shown in FIG. 1.

FIG. 2 is a schematic cross-sectional view showing a preferred embodiment of the catalyst for electrode included in at least one of the cathode catalyst layer 1*c* and the anode catalyst layer 2*c* of the MEA10 shown in FIG. 1. Further, FIG. 3 is an enlarged schematic cross-sectional view showing a schematic configuration of the catalyst for electrode 20 shown in FIG. 2.

Figure 3:
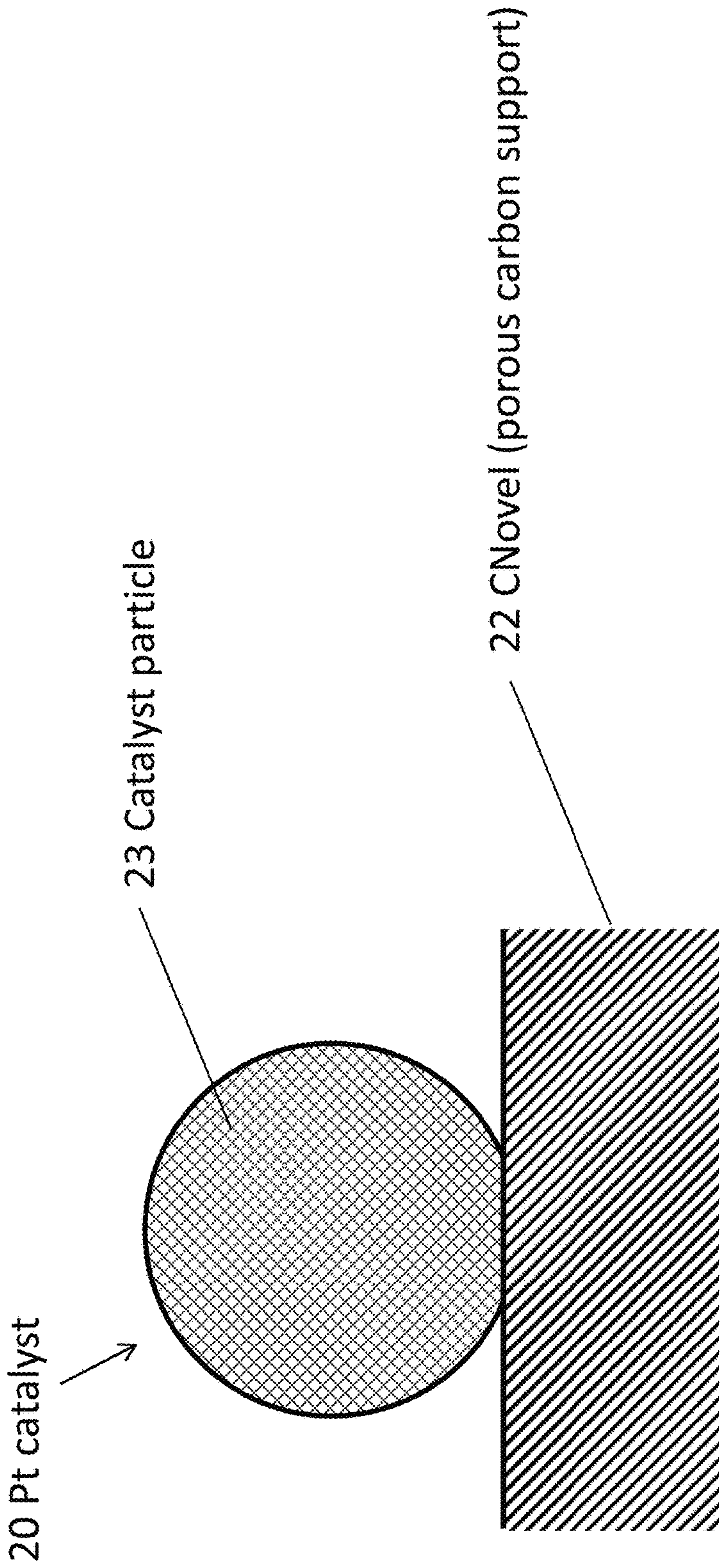
FIG. 3 An enlarged schematic cross-sectional view showing a schematic configuration of the catalyst for electrode shown in FIG. 2.

As shown in FIG. 2 and FIG. 3, the catalyst for electrode 20 includes a support 22, which is a porous carbon support, and a catalyst particle 23, which is supported on the support 22.

Figure 24:
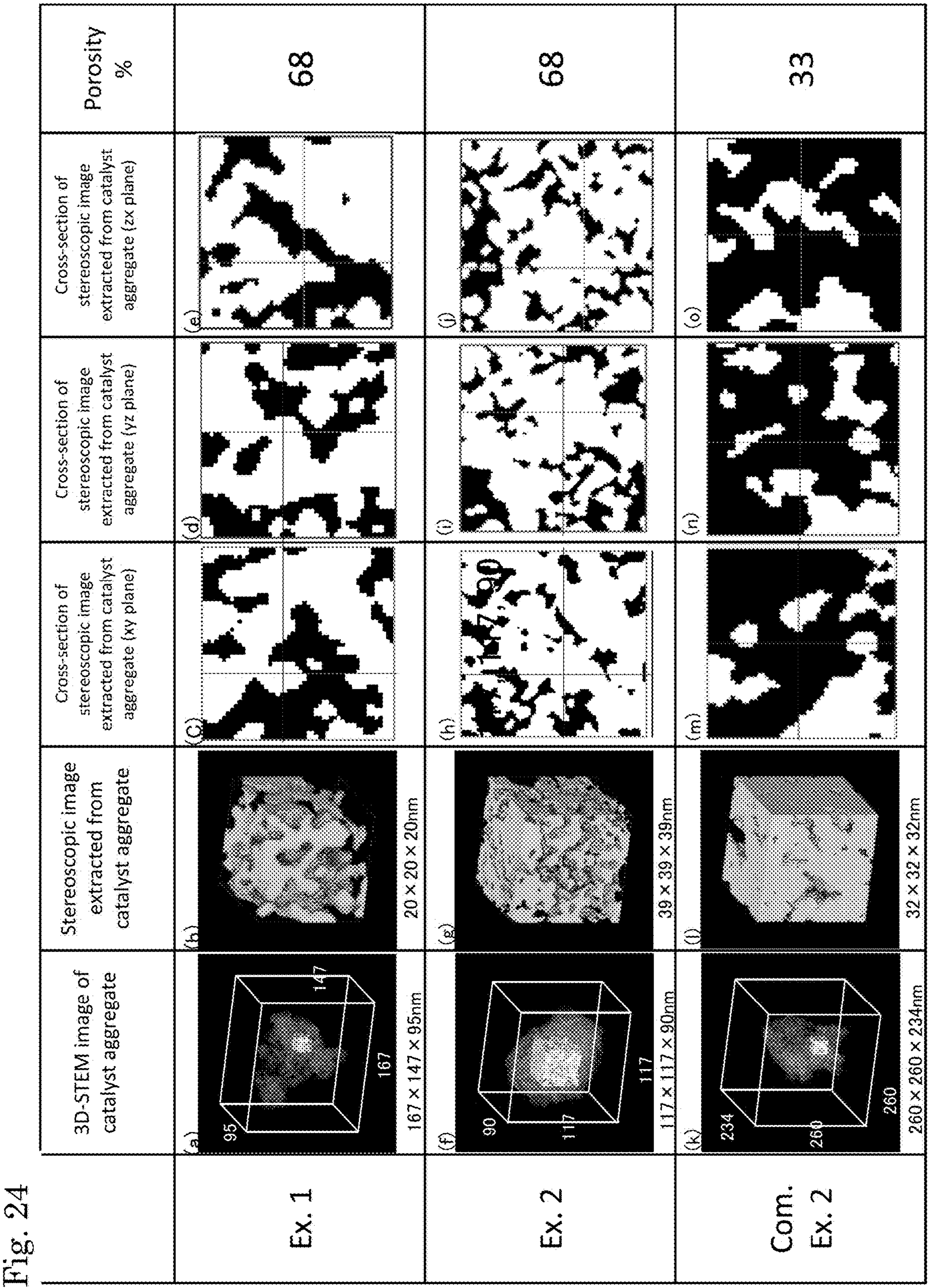
FIG. 24 A table where a plural of 3D-STEM images (three-dimensional reconstructed image) obtained by the electron tomography measurement with the STEM with respect to each of the catalysts for electrode of Example 1 and Example 2, and the catalyst for electrode of Comparative Example 2 are described together.

FIG. 24 is a table where a plural of 3D-STEM images (three-dimensional reconstructed image) obtained by the electron tomography measurement with the STEM with respect to each of the catalysts for electrode of Example 1 and Example 2 (working examples of the present catalyst for electrode 20), and the catalyst for electrode of Comparative Example 2 are described together.

Figure 25:
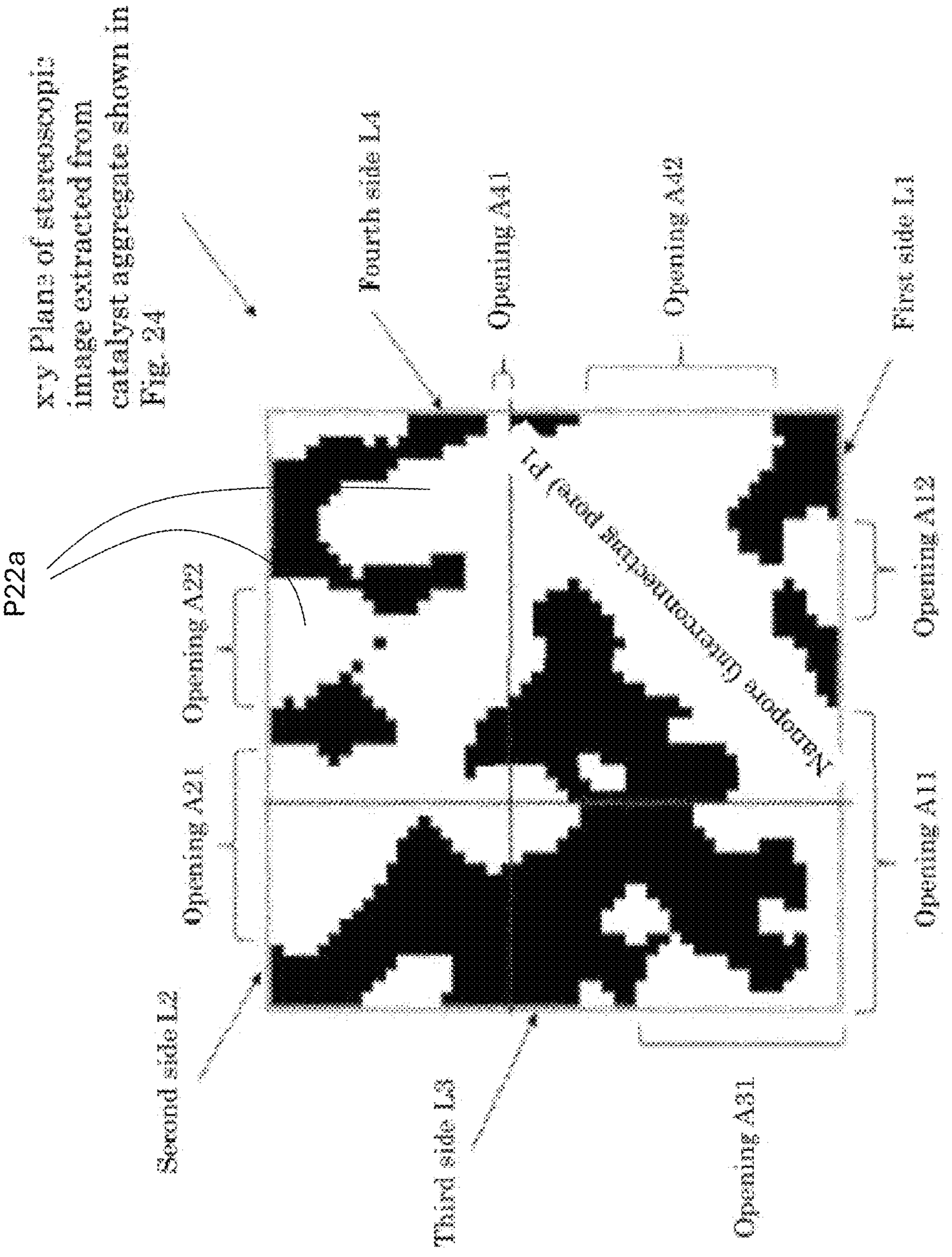
FIG. 25 An enlarged photograph of the cross-section (x-y plane) of the stereoscopic image which is extracted the 3D-STEM image (three-dimensional reconstructed image) of the catalyst aggregate of the catalyst for electrode of Example 1 shown in FIG. 24.

FIG. 25 is an enlarged photograph of the cross-section (x-y plane) of the stereoscopic image which is extracted the 3D-STEM image (three-dimensional reconstructed image) of the catalyst aggregate of the catalyst for electrode of Example 1 (working example of the present catalyst for electrode 20) shown in FIG. 24.

Further, the catalyst for electrode 20 shown in FIG. 2 to FIG. 3 preferably satisfies the following conditions from the viewpoint of more reliably obtaining the effect of the present invention.

That is, as described above, when the microstructure is observed by using the three-dimensional reconstructed image of STEM as described above, the catalyst for electrode 20 has the structure which satisfies the condition (a) the ratio of the catalyst particle supported inside the nanopore is 50% or more, and the condition (8) the nanopore is formed so as to have the aforementioned shape.

To explain the condition (a) in detail, when observing the fine structure of the catalyst for electrode 20 according to the information of the three-dimensional reconstructed image of STEM obtained in the above-described steps (A) to (C), the ratio of the catalyst particle 23 supported inside the nanopore P22 is 50% or more.

Furthermore, from the viewpoint of obtaining the effect of the present invention more reliably, when the particle size distribution of the catalyst particle 23 is analyzed by using the above-described three-dimensional reconstructed image, the ratio of the catalyst particle 23 supported inside the nanopore P22 in the catalyst for electrode 20 is preferably 55% or more, more preferably 60% or more, further more preferably 70% or more.

To explain the condition (B) in detail, when observing according to the information of the three-dimensional reconstructed image of STEM obtained in the above-described steps (D) to (G), the catalyst for electrode 20 has the following structure.

More specifically explaining, when looking at six square cross sections of "the stereoscopic image (one side of 20 to 50 nm) extracted from "the catalyst aggregate composed of the catalyst particle 20 (catalyst aggregate composed of the catalyst particle 23 which has a size that can be accommodated in a rectangular space with one side of 60 to 300 nm and the support 22)" which can be observed by the 3D-STEM image (three-dimensional reconstructed image), in at least one cross section, the catalyst for electrode 20 has the structure where at least one "interconnected pore P1 in which a plurality of nanopores P22 are connected" having the following shape is formed.

That is, in the catalyst for electrode 20, when the fine structure of the catalyst for electrode is observed with the 3D-STEM image (three-dimensional reconstructed image), at least, the nanopore P22 formed in at least one of the six square cross sections of the stereoscopic image obtained by cutting the inside of the catalyst aggregate has at least one opening in contact with the first side of four sides of the square cross section, and at least one opening in contact with the second side of the cross section of the square which is parallel to the first side. In addition, the nanopore P22 has the shape of an interconnected pore P1 which extends continuously from the opening on the first side to the opening on the second side without blocking.

In the following, more specific description will be made by referring the example of the catalyst for electrode of Example 1 shown in FIG. 24 and FIG. 25.

(D) First, with respect to the catalyst for electrode of Example 1 to be measured, a three-dimensional reconstructed image of STEM is obtained. From among the catalyst aggregates in the three-dimensional reconstructed image, a catalyst aggregate which has a size that can be accommodated in a rectangular space with one side of 60 to 300 nm (region of interest) is selected (FIG. 24(*a*)).

(E) Next, a stereoscopic image (20 to 50 nm on one side) is extracted from the inner region of the catalyst aggregate of the catalyst for electrode of Example 1 selected in the step (D) (FIG. 24(*b*)).

(F) Next, the stereoscopic image (three-dimensional reconstructed image of STEM) inside the catalyst aggregate of the catalyst for electrode of Example 1 obtained in the step (E) is observed, and by utilizing the difference in luminance, the part of the void (part of pore such as nanopore) and the part of the porous carbon support are segmented (FIG. 24(*b*)).

(G) Next, when observing the six square cross-sections of the stereoscopic image inside the catalyst aggregate of the catalyst for electrode of Example 1 after performing segmentation in the step (F), as shown in FIG. 25, the nanopore P1 observed in the cross section of interest (x-y plane of square) has two openings (opening A11 and opening A12) that are in contact with the first side L1. Further, the nanopore P1 has two openings (opening A21 and opening A22) in contact with a second side L2 parallel to the first side L1. Furthermore, the nanopore P1 has the shape of interconnected pore P1 that continuously extends from the openings (opening A11 and opening A12) on the first side L1 to the openings (opening A21 and opening A22) on the second side L2 without blocking.

From the viewpoint of obtaining the effects of the present invention more reliably, as shown in the example of Example 1 of FIG. 25, it is preferable that the nanopore P1 of the catalyst for electrode 20 has a shape having a plural of branches.

Furthermore, from the viewpoint of obtaining the effects of the present invention more reliably, as shown in the example of Example 1 of FIG. 25, it is preferable that the nanopore P1 of the catalyst for electrode 20 has two or more openings on the first side.

Further, from the viewpoint of obtaining the effects of the present invention more reliably, as shown in the example of Example 1 of FIG. 25, it is preferable that the nanopore P1 of the catalyst for electrode 20 has two or more openings on the second side.

Furthermore, from the viewpoint of obtaining the effects of the present invention more reliably, as shown in the example of Example 1 of FIG. 25, it is preferable that the nanopore P1 of the catalyst for electrode 20 has at least one opening on the third side perpendicular to the first side. Explaining by referring the example of Example 1 described later, as shown in FIG. 25, the nanopore P1 observed in the cross section of interest (x-y plane of the square) has one opening (opening A31) on the third side L3 perpendicular to the first side L1.

Furthermore, from the viewpoint of obtaining the effects of the present invention more reliably, as shown in the example of Example 1 of FIG. 25, it is preferable that the nanopore P1 of the catalyst for electrode 20 has at least one opening on the fourth side perpendicular to the first side. For example, explaining by referring the example of Example 1 described later, as shown in FIG. 25, the nanopore P1 observed in the cross section of interest (x-y plane of the square) also has two openings (opening A41 and opening A42) on the fourth side L4 perpendicular to the first side L1.

Furthermore, from the viewpoint of obtaining the effects of the present invention more reliably, in the catalyst for electrode 20, it is preferable that a porosity measured by using the three-dimensional reconstructed image of STEM (stereoscopic image of interest) is 35% or more, more preferably 40% or more, more preferably 45% or more, furthermore preferably 50% or more, furthermore preferably 55% or more, furthermore preferably 60% or more, furthermore preferably 65% or more. On the other hand, from the viewpoint of durability, in the catalyst for electrode 20, it is preferable that a porosity measured by using the three-dimensional reconstructed image of STEM (stereoscopic image of interest) is 80% or less, more preferably 75% or less.

Here, a region made of Pt (0 valence) is formed on at least a part of the surface of the catalyst particle 23. Provided that, within the range where the effects of the present invention can be obtained, a Pt oxide layer may be formed on the region of the surface made of Pt (0 valence) of the catalyst particle 23.

As a more specific structure of the catalyst particle 23, when the catalyst particle 23 is made of Pt (0 valence), not particularly limited, when the catalyst particle 23 is made of a Pt alloy, it is preferable that the catalyst particle 23 is a core-shell catalyst particle.

When the catalyst particle 23 is made of a Pt alloy, the metal specie other than Pt, which is an element of the alloy is not particularly limited. From the viewpoint of obtaining excellent catalytic activity, it is preferable that the metal species other than Pt, which is an element of the alloy, is at least one metal of Co and Ni.

When the catalyst particle 23 is the core-shell catalyst particle, from the viewpoint of obtaining excellent catalytic activity, it is preferable that the core-shell catalyst particle is composed of a core particle and a Pt shell layer (a region composed of Pt (0 valence)) formed on at least a part of the surface of the core particle. The metal specie constituting the core particles is not particularly limited, but at least one of Pd, Ni and Co is preferable from the viewpoint of obtaining excellent catalytic activity. Further, the core particle may be an alloy of at least one of Pd, Ni and Co and other metal. From the viewpoint of reducing the amount of precious metal used, the core particle may contain at least one of a base metal other than precious metal and a base metal oxide, a base metal nitride, and a base metal carbide.

Further, the catalyst for electrode 20 preferably has an average value of crystallite size of 3 to 16.0 nm as measured by powder X-ray diffraction (XRD).

Further, a Pt loading ratio of the catalyst for electrode 20 is preferably 5.6 to 66.5 wt %.

The support 22 preferably satisfies the above conditions ($\alpha$) and ($\beta$) when used as an catalyst for electrode. From this point of view, as the support 22, a carbon selected among CNovel (manufactured by Toyo Tanso Co., Ltd., product name, registered trademark) which can satisfy the above conditions ($\alpha$) and ($\beta$) when used as an catalyst for electrode is preferable.

As shown in FIG. 2, in the present embodiment, the support 22 is a porous carbon which has nanopore P22 (pore diameter of 1 to 20 nm, preferably 1 to 10 nm), micropore P24 (pore diameter of less than 1 nm) and a carbonaceous wall forming the outline of the nanopore P22. The carbonaceous wall has a portion forming a layered structure, and has a three-dimensional network structure. In the part of the layered structure of the carbonaceous wall, Crystallinity is developed.

Usually, this layered structure is produced by heat-treating the carbon materials at a certain temperature or higher. However, in general, since carbon materials shrink during the heat treatment, the pores tend to collapse and the specific surface area tends to decrease, and thus, when crystallinity develops, it is difficult to obtain a porous carbon having a high specific surface area.

On the other hand, since the support 22 has the nanopore P22 and the carbonaceous wall forming the outlines of the nanopores P22, it can withstand the shrinkage during the heat treatment, and the layered structure is sufficiently formed in the carbonaceous walls, and the specific surface area is sufficiently secured.

Further, since the carbonaceous wall has a three-dimensional network structure, the support 22 can carry catalyst particles as small as several nanometers in a highly dispersed state, and is suitable as a support for the catalyst layer of the fuel cell. It should be noted that the support 22 does not need to have the layered structure in the entire carbonaceous wall, and may partially have an amorphous portion.

Further, it is preferable that the support 22 has a specific surface area of 200 $m^2/g$ to 1500 $m^2/g$. When the specific surface area is 200 $m^2/g$ or more, it becomes easier to form the three-dimensional network structure more reliably. Thereby, the pores can be sufficiently formed, and it becomes easier to have sufficient gas adsorption ability. On the other hand, when the specific surface area is 1500 $m^2/g$ or less, it becomes easier to form the carbonaceous wall more reliably. This makes it easier to sufficiently form the nanopores P22.

Here, as shown in FIG. 2, in the support 22, the nanopore P22 is an open pore, and has the structure in which the nanopore P22 is continuously connected to form the connecting pore P1. With this structure, the reaction gas can flow smoothly in the catalyst layer (catalyst layer 1*c* or catalyst layer 2*c*).

From the viewpoint of having sufficient electrical conductivity, the support 22 preferably has a specific resistance of $10.0\times10^2$ Ω·cm or less, more preferably $5.0\times10^2$ Ω·cm or less, and further preferably $1.0\times10^2$ Ω·cm or less.

Further, the support 22 may contain micropores having a pore diameter of less than 1 nm (relatively small pores among pores classified as so-called micropores), and micropores having a pore diameter of more than 20 nm to not more than 50 nm (relatively large pores among pores classified as so-called mesopores), within the range where the effects of the present invention can be obtained.

Furthermore, it is preferable that the support 22 is a porous carbon support having good dispersibility in the gas diffusion electrode forming composition including the catalyst for electrode 20 and excellent electrical conductivity.

Here, as shown in FIG. 2, the catalyst particle 23 is supported both inside the nanopores P22 of the support 22 and outside the nanopores P22.

Then, the catalyst for electrode 20 simultaneously satisfies the conditions of the following the equations (1) to (3) in case that a measurement of electron beam tomography (electron tomography) by 3D-STEM is carried out.

$$(D10/D20) \geq 0.80 \tag{1}$$

$$D1 \leq D2 \tag{2}$$

$$(N1/N2) > 1.0 \tag{3}$$

Here, in the equations (1) to (3), D10 shows the arithmetic mean value of the sphere-equivalent diameter of the catalyst particles 23 supported on the inside of the nanopores P22 of the support 22.

Further, D20 shows the arithmetic mean value of the sphere-equivalent diameter of the catalyst particles 23 supported on the outside of the nanopores P22 of the support 22.

Furthermore, D1 indicates a sphere equivalent diameter (nm) of particles exhibiting a maximum frequency (maximum number of particles) among the catalyst particles 23 supported inside the nanopore P22 of the support 22.

Further, D2 indicates a sphere equivalent diameter (nm) of particles exhibiting a maximum frequency (maximum number of particles) among the catalyst particles 23 supported outside the nanopore P22 of the support 22.

Furthermore, N1 indicates a frequency (number of particles) of particles exhibiting a maximum frequency (maximum number of particles) among the catalyst particles 23 supported inside the nanopore P22 of the support 22.

Further, N2 indicates a frequency (number of particles) of particles exhibiting a maximum frequency (maximum number of particles) among the catalyst particles 23 supported outside the nanopore P22 of the support 22.

In the case of the catalyst for electrode 20 which simultaneously satisfies the conditions of the equations (1) to (3), as compared with a conventional catalyst for electrode 200, there exist many catalyst particles 23 with high activity inside the nanopore P22 of the support 22 in a relatively small particle size. The catalyst particle 23 supported inside the nanopores P22 of such a support 22 exhibits excellent catalytic activity when made into an electrode as compared with a conventional catalyst for electrode 200. Further, the catalyst particle is supported on the support 22 in a state in which it is difficult to directly contact with a polymer electrolyte such as Nafion included in the catalyst layer (catalyst layer 1*c* or catalyst layer 2*c*), and the dissolution of the Pt component is also reduced.

Here, from the viewpoint of obtaining the effects of the present invention more reliably, the value of (D10/D20) of the equation (1) is preferably 0.85 or more, more preferably 0.90 or more.

The method for producing the catalyst for electrode 20 is not particularly limited and can be produced by a known method, except that it includes a "support pretreatment step", a "Pt addition step", and a "reduction step" for satisfying the conditions of the equations (1) to (3).

In the support pretreatment step, the support 22 is put into an ultrapure water, and a pH adjuster is further added to prepare a dispersion whose pH is adjusted to 2 to 5. Furthermore, the temperature of the dispersion is kept at 80 to 99° C., preferably 90 to 99° C. for a predetermined time while stirring (however, the state of not boiling is maintained). Then, the temperature of the dispersion is lowered to room temperature.

Thus, the gas inside the nanopore P22 of the support 22 is removed, so that ultrapure water can sufficiently enter into inside the nanopore P22. Then, in the subsequent "Pt addition step", the Pt raw materials are sufficiently held inside the nanopore P22 of the support 22. Thus, a large number of precursors of the Pt catalyst particle are supported inside the nanopore P22 of the support 22.

Note that "ultrapure water" used as the preparation of the aqueous solution in this support pretreatment step is water in which the specific resistance R (reciprocal of the electric conductivity measured by the JIB standard test method (JIB K0552)) represented by the following the equation (4) is 3.0 M Q-cm or more. In addition, it is preferable that "ultrapure water" has a quality equivalent to "A3" or a clean quality equivalent to or higher than that of "A3" defined in "JISK0557 water used for testing of water and waste".

This ultrapure water is not particularly limited as long as it has an electric conductivity satisfying the relation represented by the following equation (4). For example, ultrapure water produced using an ultrapure water producing apparatus "Milli-Q Series" (manufactured by Merck Co., Ltd.) and "Elix UV Series" (manufactured by Nippon Millipore Co., Ltd.) can be mentioned as the above ultrapure water.

$$R = 1/p \tag{4}$$

In the above equation (4), R represents a specific resistance, and p represents an electric conductivity measured by a JIS standard test method (JIS K0552).

The next step of the "support pretreatment step" is the "Pt addition step". In this "Pt addition step", an aqueous solution of a water-soluble Pt salt (N. E. CHEMCAT, trade name "A-salt" (concentration of Fe component: 8 ppm or less)) dissolved in ultrapure water is added to the dispersion liquid of the support 22 obtained through the "support pretreatment step" at room temperature.

The next step of the "Pt addition step" is the "reduction step". In this "reduction step", the temperature of the liquid obtained through the "Pt addition step" is raised to 50° C. or higher, and an aqueous solution in which a water-soluble reducing agent (preferably an acidic water-soluble reducing agent) is dissolved is added. After the addition of the reducing agent, the liquid temperature is maintained at 50° C. or higher for a predetermined period of time to allow the reduction reaction to proceed, and then the temperature of the liquid is lowered to room temperature.

The next step of the "reduction step" is the "washing step". In this "washing step", the solid component and the liquid component in the liquid obtained through the "reduction step" are separated, and the solid content (a mixture of a Pt/C catalyst and other impurities) is washed. For example, the solid component in the liquid obtained through the "reduction step" may be separated from the liquid component by using a filtering means such as filter paper or a filter cloth. The solid content may be washed with the above-mentioned ultrapure water, a pure water (specific resistance R represented by the above equation (4) is 0.1 MΩ·cm or more and less than 3.0 MΩ·cm), or a pure warm water (temperature of pure water being 40 to 80° C.) may be used. For example, when the pure warm water is used, the filtrate is washed repeatedly until the electrical conductivity after washing becomes less than 10 μS/cm.

The next step after the "washing step" is the "drying step". In this "drying step", water is separated from the solid component (mixture of Pt/C catalyst and water) obtained through the "washing step". First, the solid component is air-dried, and then dried in a dryer at a predetermined temperature for a predetermined time.

The next step after the "drying step" is the "crushing step". In this "crushing step", the solid component (Pt/C catalyst) obtained from the "drying step" is crushed to the catalyst powder with a crushing means such as a mixer.

The polymer electrolyte contained in the catalyst layer 1*c* and the catalyst layer 2*c* is not particularly limited as long as it has hydrogen ion conductivity, and known ones can be used. For example, the polymer electrolyte can exemplify a known perfluorocarbon resin having a sulfonic acid group and a carboxylic acid group. Examples of easily available polymer electrolytes having hydrogen ion conductivity include Nafion (registered trademark, manufactured by DuPont), Aciplex (registered trademark, manufactured by Asahi Kasei Co., Ltd.), and Flemion (registered trademark, manufactured by Asahi Glass Co., Ltd.).

Then, at least one of the catalyst layer 1*c* of the cathode 1 and the catalyst layer 2*c* of the anode 2 shown in FIG. 1 has a mass ratio N/C of the mass N of the polymer electrolyte to the mass C of the support 22 of 0.5 to 1.2, and more preferably a mass ratio N/C of 0.7 to 1.0.

(Gas Diffusion Layer (GDL))

The gas diffusion layer 1*gd* provided in the cathode 1 shown in FIG. 1 is a layer provided for supplying an oxidant gas (e.g., oxygen gas, air) to the catalyst layer 1*c*. In addition, the gas diffusion layer 1*gd* serves to support the catalyst layer 1*c*.

In addition, the gas diffusion layer 2*gd* provided in the anode 2 is a layer provided for supplying a reducing agent gas (e.g., hydrogen gas) to the catalyst layer 2*c*. And, the gas diffusion layer 2*gd* serves to support the catalyst layer 2*c*.

The gas diffusion layer (1*gd*) shown in FIG. 1 has a function and structure to pass hydrogen gas or air (oxygen gas) well to reach the catalyst layer. Therefore, it is preferable that the gas diffusion layer has water repellency. For example, the gas diffusing layer has a water repellent component such as polyethylene terephthalate (PTFE).

The member which can be used for the gas diffusion layer (1*gd*) is not particularly limited, and a known member can be used. For example, preferably, there are exemplified carbon paper and other material, in which carbon paper is used as a main material and auxiliary materials including carbon powder, ion exchange water, and a polyethylene terephthalate dispersion as a binder is applied on the carbon paper.

(Water Repellent Layer (MPL))

As shown in FIG. 1, a water repellent layer (MPL) 1*m* is arranged between the gas diffusion layer 1*gd* and the catalyst layer 1*c* at the cathode 1. The water repellent layer 1*m* has electronic conductivity, water repellency, and gas diffusing property, and is provided for facilitating diffusion of the oxidant gas into the catalyst layer 1*gd* and discharge of the reaction product water generated in the catalyst layer 1*gd*. The configuration of the water repellent layer 1*m* is not particularly limited, and a known configuration can be employed.

(Polymer Electrolyte Membrane (PEM))

The polymer electrolyte membrane (PEM) 3 shown in FIG. 1 is not particularly limited as long as it has hydrogen ion conductivity, and a known one conventionally used in PEFC can be employed. For example, it may be a membrane including as a constituent a polymer electrolyte exemplified above as ones contained in the catalyst layer 1*c* and the catalyst layer 2*c*.

Modified Embodiment of MEA

While a preferred embodiment of the MEA of the present invention (and the catalyst layer of the present invention, the gas diffusion electrode of the present invention) is described above, the MEA of the present invention is not limited to the configuration of the MEA 10 shown in FIG. 1.

Figure 4:
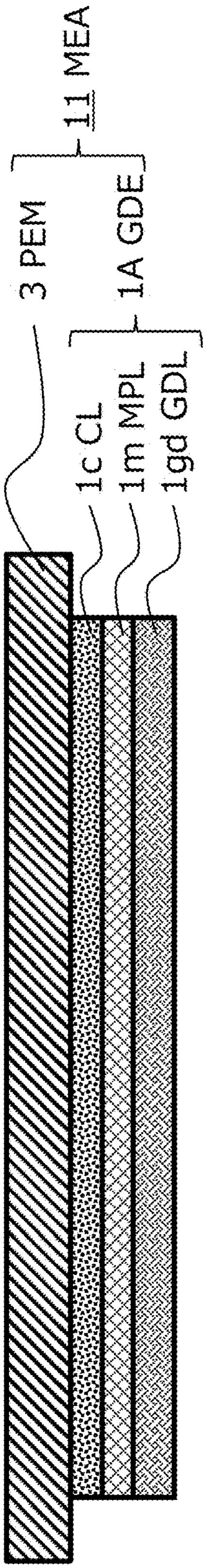
FIG. 4 A schematic cross-sectional view showing another preferred embodiment of the MEA of the present invention.

For example, the MEA of the present invention may have the configuration of the MEA 11 shown in FIG. 4.

FIG. 4 is a schematic cross-sectional view illustrating another preferred embodiment of the MEA of the present invention. The MEA 11 shown in FIG. 4 has a configuration in which the gas diffusing electrode (GDE) 1A having the same configuration as that of the cathode 1 in the MEA10 shown in FIG. 1 is arranged on only one side of the polymer electrolyte membrane (PEM) 3. However, the catalyst layer 1*c* of the gas diffusion electrode (GDE) 1A has a configuration of the catalyst layer of the present invention. In other words, the catalyst layer 1*c* of the GDE 1A has a mass ratio N/C of the mass N of the polymer electrolyte to the mass C of the support 22 of the catalyst for electrode 20 of 0.5 to 1.2, more preferably 0.7 to 1.0.

<Membrane-Electrode Assembly (CCM)>

Next, a preferred embodiment of the membrane-electrode assembly (CCM: Catalyst Coated Membrane) of the present invention will be described.

Figure 5:
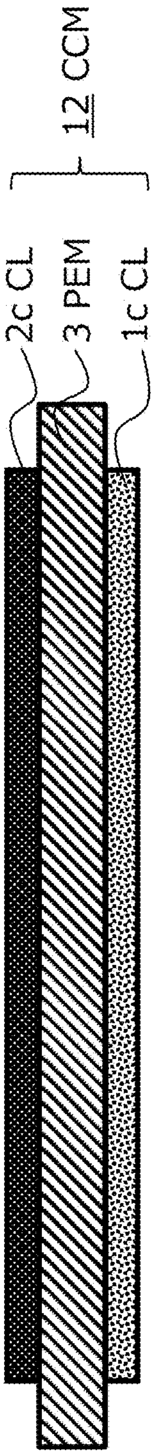
FIG. 5 A schematic cross-sectional view showing a preferred embodiment of the CCM of the present invention.

FIG. 5 is a schematic cross-sectional view showing a preferred embodiment of the CCM of the present invention. The CCM 12 shown in FIG. 5 has a configuration in which a polymer electrolyte membrane (PEM) 3 is arranged between the cathode catalyst layer 1*c* and the anode catalyst layer 2*c*. Then, at least one of the cathode catalyst layer 1*c* and the anode catalyst layer 2*c* has a configuration of the catalyst layer of the present invention. In other words, at least one of the cathode catalyst layer 1*c* and the anode catalyst layer 2*c* has a mass ratio N/C of the mass N of the polymer electrolyte to the mass C of the support of the catalyst for electrode 20 of 0.5 to 1.2, more preferably 0.7 to 1.0.

Modified Embodiment of Membrane-Electrode Assembly (CCM)

While a preferred embodiment of the CCM of the present invention has been described above, the CCM of the present invention is not limited to the configuration of the CCM 12 shown in FIG. 5.

Figure 6:
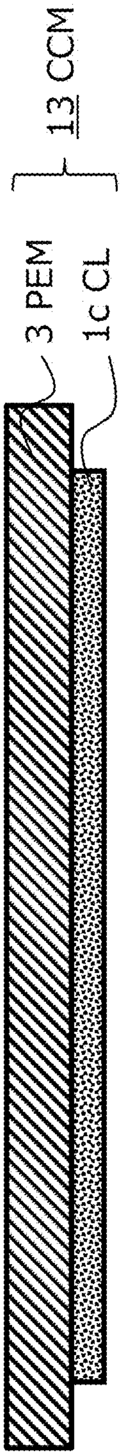
FIG. 6 A schematic cross-sectional view showing another preferred embodiment of the CCM of the present invention.

For example, the CCM of the present invention may have a configuration of the CCM 13 shown in FIG. 6.

Figure 7:
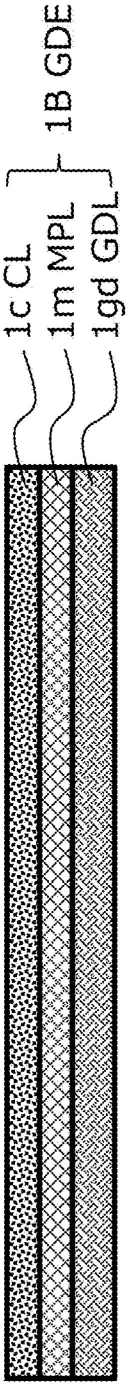
FIG. 7 A schematic cross-sectional view showing a preferred embodiment of the GDE of the present invention.

FIG. 7 is a schematic cross-sectional view illustrating another preferred embodiment of the CCM of the present invention. The CCM 13 shown in FIG. 6 has a configuration in which the catalyst layer 1*c* having the same configuration as that of the cathode 1 in the CCM 12 shown in FIG. 5 is arranged on only one side of the polymer electrolyte membrane (PEM) 3. However, the catalyst layer 1*c* of the gas diffusion electrode (GDE) 1A has a configuration of the catalyst layer of the present invention. In other words, the catalyst layer 1*c* of the CCM 13 has a mass ratio N/C of the mass N of the polymer electrolyte to the mass C of the support of the catalyst for electrode 20 of 0.5 to 1.2, more preferably 0.7 to 1.0.

<Gas Diffusion Electrode (GDE)>

Next, a preferred embodiment of the gas diffusion electrode (GDE) of the present invention will be described.

Figure 8:
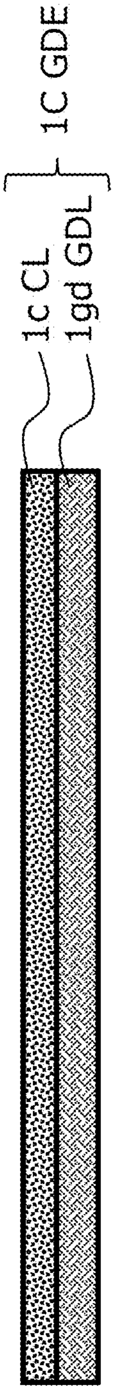
FIG. 8 A schematic cross-sectional view showing another preferred embodiment of the GDE of the present invention.

FIG. 8 is a schematic cross-sectional view showing a preferred embodiment of the GDE of the present invention. The gas diffusion electrode (GDE) 1B shown in FIG. 7 has the same configuration as that of the cathode 1 mounted on the MEA 10 shown in FIG. 1. However, the catalyst layer 1*c* of the gas diffusion electrode (GDE) 1B has a configuration of the catalyst layer of the present invention. In other words, the catalyst layer 1*c* of the gas diffusion electrode (GDE) 1B has a mass ratio N/C of the mass N of the polymer electrolyte to the mass C of the support 22 of the catalyst for electrode 20 of 0.5 to 1.2, more preferably 0.7 to 1.0.

Modified Embodiment of Gas Diffusion Electrode (GDE)

While a preferred embodiment of the GDE of the present invention has been described above, the GDE of the present invention is not limited to the configuration of the GDE 1B shown in FIG. 7.

For example, the GDE of the present invention may have the composition of GDE 1C shown in FIG. 8.

Figure 9:
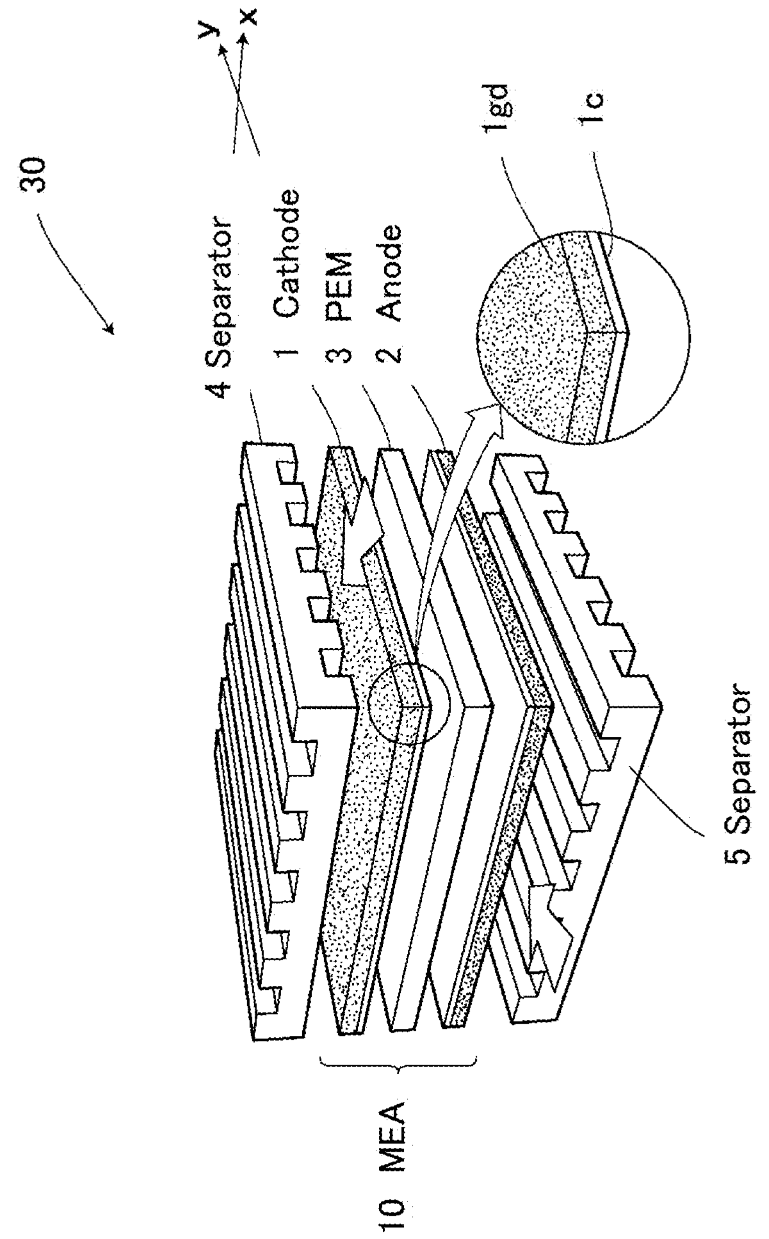
FIG. 9 A schematic diagram showing one preferred embodiment of the fuel cell stack of the present invention.
Figure 10:
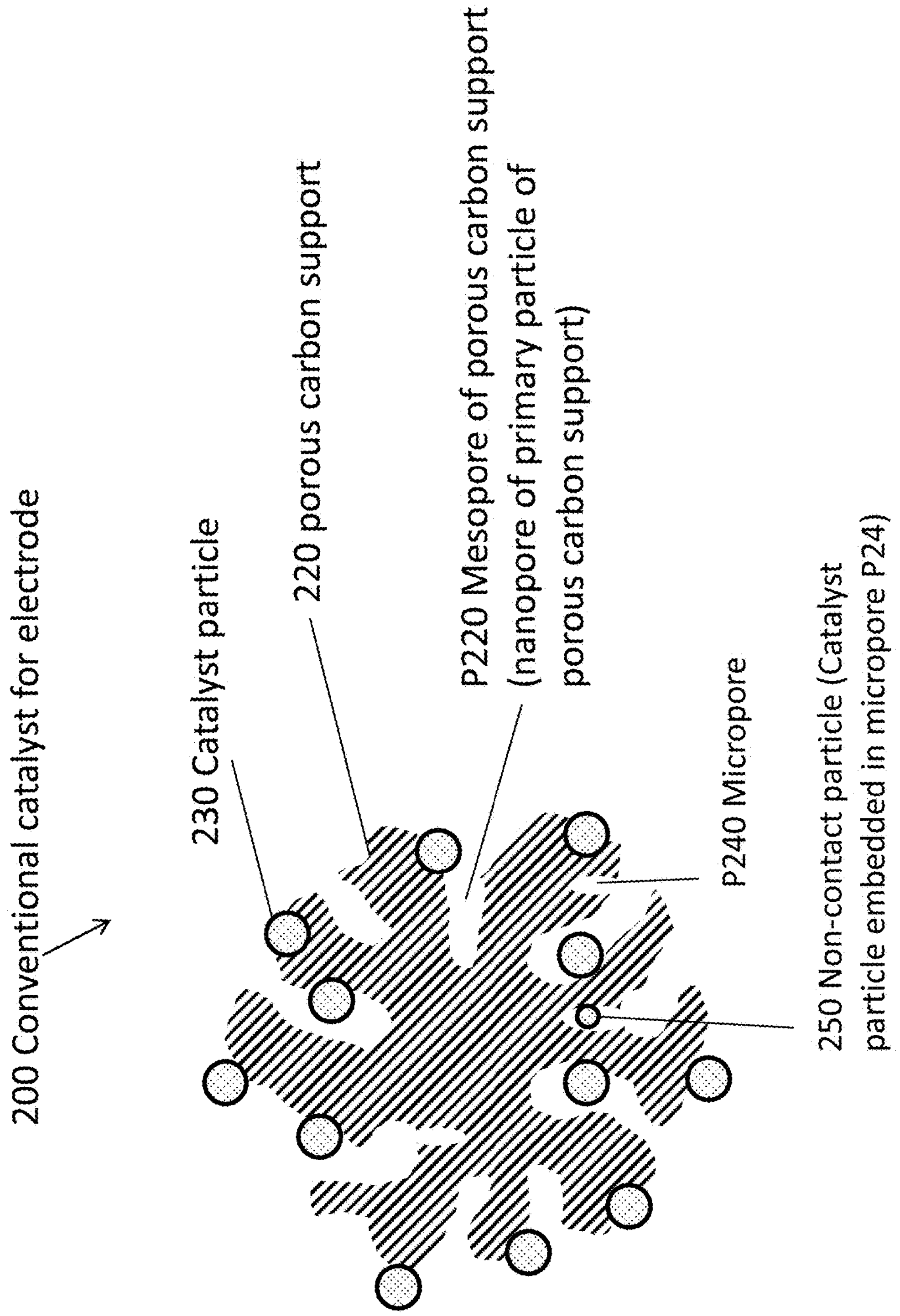
FIG. 10 A schematic cross-sectional view showing a conventional catalyst for electrode.

FIG. 9 is a schematic cross-sectional view illustrating another preferred embodiment of the GDE of the present invention. The GDE 1C shown in FIG. 8 has a configuration in which the water repellent layer (MPL) is not arranged between the catalyst layer 1*c* and the gas diffusion layer 1*gd* as compared with the GDE 1B shown in FIG. 8.

<Composition for Forming Catalyst Layer>

Next, a preferred embodiment of the composition for forming catalyst layer of the present invention will be described.

A composition for forming catalyst layer of the present embodiment includes the catalyst for electrode 20, a polymer electrolyte, and a main component, and has a mass ratio N/C of mass N of polymer electrolyte to mass C of support 22 of the catalyst for electrode 20 of 0.5 to 1.2, more preferably 0.7 to 1.0.

Here, the composition of the liquid including the polymer electrolyte is not particularly limited. For example, a liquid including a polymer electrolyte may contain a polymer electrolyte having hydrogen ion conductivity described above, water, and an alcohol.

The composition ratio of the catalyst for electrode 20, the polymer electrolyte, and other components (water, alcohol, and the like) included in the composition for forming catalyst layer is appropriately set so that the dispersion state of the catalyst for electrode 20 in the obtained catalyst layer becomes good and the power generation performance of the MEA 10 including the catalyst layer can be improved.

The composition for forming catalyst layer can be prepared by mixing a liquid including the catalyst for electrode 20 and the polymer electrolyte and stirring the mixture. From the viewpoint of adjusting applicability, a polyhydric alcohol such as glycerin and/or water may be contained. When the liquid including the catalyst for electrode 20, the polymer electrolyte is mixed, a pulverizing and mixing machine such as a ball mill, an ultrasonic disperser and the like can be used.

At least one of the catalyst layer 1*c* of the cathode 1 and the catalyst layer 2*c* of the anode 2 shown in FIG. 1 can be formed using a preferred embodiment of the composition for forming catalyst layer of the present invention.

Method for Producing Gas Diffusion Electrode

Next, an example of a method of producing gas diffusion electrode of the present invention will be described. It is sufficient that the gas diffusion electrode is formed so as to include the catalyst layer of the present invention, and a known method can be employed for the producing method. It can be more reliably produced by using the composition for forming catalyst layer of the present invention.

For example, it may be produced by coating a composition for forming catalyst layer on a gas diffusion layer (or a water repellent layer of a laminate in which a water repellent layer is formed on a gas diffusion layer) and drying the composition.

<Fuel Cell Stack>

FIG. 9 is a schematic diagram illustrating one preferred embodiment of the fuel cell stack of the present invention.

The fuel cell stack 30 illustrated in FIG. 9 has a configuration in which the MEA 10 shown in FIG. 1 is a unit cell and a plurality of the unit cells are stacked. Further, the fuel cell stack 30 has a configuration in which the MEA10 is arranged between the separator 4 and the separator 5. A gas flow passage is formed in the separator 4 and the separator 5, respectively.

EXAMPLE

The present invention is further illustrated by the following examples, which are not intended to limit the present invention.

(I) Preparation of the Catalyst for Electrode to be Used for the Catalyst Layer of the Cathode of MEA

(1) Production of Pt/C Catalyst to be Used for the Cathode of MEA of Example 1

[Pt Catalyst Particle-Supported Carbon Catalyst "Pt/C Catalyst" Powder]

Powder of Pt/C catalyst powder in which catalyst particles made of Pt are supported on the following support {Pt loading ratio 48.0 wt %, trade name "SA50BM-A207", manufactured by N.E. CHEMCAT)} was prepared.

The powder of this Pt/C catalyst (hereinafter, referred to as "Pt/C catalyst A" if necessary) was prepared in the following procedures.

(First Step (Support Pretreatment Step))

A dispersion liquid, in which a trial sample product "CNovel A" manufactured by Toyo Tanso Co., Ltd. as the porous carbon support (BET specific surface area: 1200 $m^2/g$) was dispersed in the aqueous solution adjusted to pH=2 to 5 (prepared by adding a pH adjuster to ultrapure water), was held at 90 to 99° C. for about 0.5 hours while stirring (although a not boiled state was retained).

Note that "ultrapure water" used in this first step (support pretreatment step) was a water having a specific resistance R (reciprocal of electric conductivity measured by a JIS standard test method (JIS K0552)) represented by the following equation (4) of 3.0 MΩ·cm or more. In addition, ultrapure water had a water quality equivalent to or higher than that of A3 specified in JISK0557 Water for Testing Water and Wastewater.

This ultrapure water was produced using an ultrapure water producing apparatus "Milli-Q Series" (manufactured by Merck Co., Ltd.) and "Elix UV Series" (manufactured by Nippon Millipore Co., Ltd.).

$$R = 1/p \tag{4}$$

In the above general equation (4), R represents a specific resistance, and p represents an electric conductivity measured by a JIS standard test method (JIS K0552).

(Second Step (Pt Addition Step))

After preparing a mixed solution by adding an aqueous solution of a water-soluble Pt salt (N. E. CHEMCAT, trade name "A-salt" (concentration of Fe component: 8 ppm or less)) in ultrapure water to the dispersion obtained through the first step, the pH was adjusted to 7 to 12, and the mixture was stirred while maintaining a predetermined temperature of 50° C. or higher for a predetermined time.

(Third Step (Reduction Step))

By adding an aqueous solution in which an acidic water-soluble reducing agent is dissolved to the liquid obtained through the second step, the Pt ions in the mixed liquid were reduced to obtain the Pt catalyst particle-supported carbon "Pt/C" powder.

(Fourth Step (Washing Step))

By using a filter paper, the solid component and the liquid component in the liquid obtained through the "third step" were separated. Next, the solid content (a mixture of the Pt/C catalyst and other impurities) remaining on the filter paper was washed with the above-mentioned pure water and pure warm water. First, washing with pure water was performed. This washing was repeated until the electric conductivity of the filtrate after washing became less than 20 μS/cm. Next, washing with pure warm water was performed. This washing was repeated until the electric conductivity of the filtrate after washing became less than 10 μS/cm.

(Fifth Step (Drying Step))

The solid component (mixture of Pt/C catalyst and water) on the filter paper obtained through the "fourth step" was air-dried in the air in this state. After this air drying, the solid component on the filter paper was transferred to a magnetic dish and dried in an electric dryer at a predetermined temperature of 60° C. or higher for a predetermined time.

(Sixth Step (Crushing Step))

The solid component (Pt/C catalyst) obtained in the "fifth step" was crushed by using a mixer to obtain a powder of Pt/C catalyst A.

<Measurement of Loading Ratio (ICP Analysis)>

For this Pt/C catalyst A, the Pt loading ratio (wt %) was determined by the following methods.

The Pt/C catalyst A was immersed in aqua regia to dissolve the metal. The carbon as the insoluble component was then removed from the aqua regia. Next, the aqua regia from which the carbon was removed was analyzed by ICP.

As a result of the ICP analysis, this Pt/C catalyst A had the Pt loading ratio of 48.0 wt %.

<Surface Observation/Structure Observation of Catalyst for Electrode>

In order to observe the three-dimensional structure of this Pt/C catalyst A of Example 1, the electron tomography measurement was carried out by using the "USAL-KM3D analysis method" with the STEM (scanning transmission electron microscope) at UBE Scientific Analysis Center Co., Ltd.

The electron tomography measurement with the STEM (scanning transmission electron microscope) was carried out according to the sample to be measured preparation method, the conditions and their analytical procedures, the conditions of (A) to (C) and (D) to (G), described above. More detailed information is described hereinbelow.

STEM apparatus: JEM-ARM200F Atomic Resolution Analytical Electron Microscopy Made by JEOL Data analysis software: 3D reconfiguration software Composer, 3D data visualization software Visualizer-kai by System Infrontia, image analysis software Colorist Measurement conditions Acceleration voltage: 60 kV Observation magnification 800,000 to 1,000,000 times Tilt angle of the sample to be measured: −80° to +80°

Tilt step angle of the sample to be measured: 2°

Pixel Count 512×512 pixels 512×512 pixels

Pixel size: 0.350 to 0.500 nm/pixel

Figure 11:
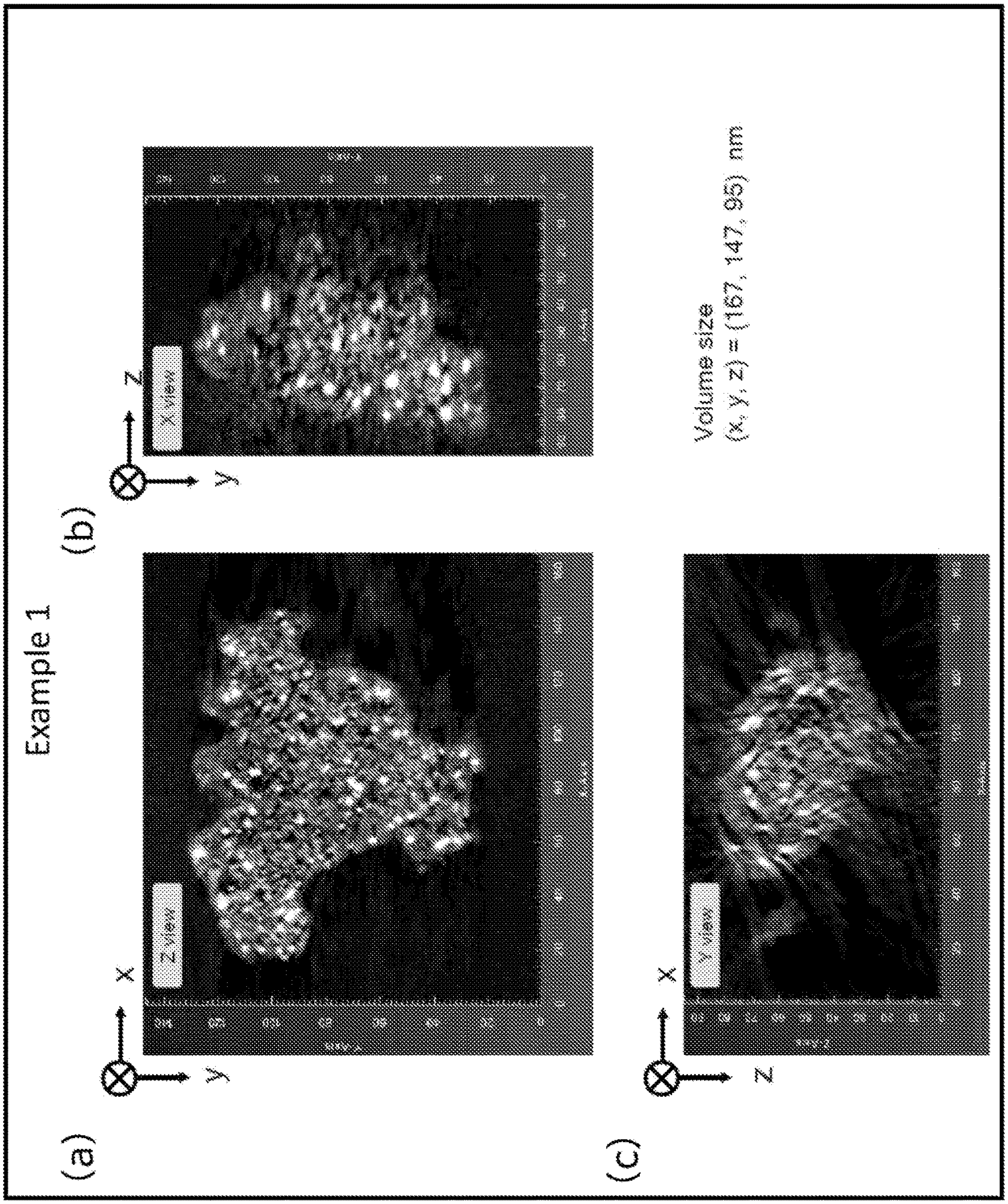
FIG. 11 An STEM image showing 3D-electron beam tomography (electron tomography) measurement conditions (volume size) using an STEM of the catalyst for electrode of Example 1.

Volume Size: as shown in FIG. 11.

With respect to the Pt/C catalyst A, by image analysis of a three-dimensional reconstructed image (3D-STEM image) obtained by electron beam tomography (electron tomography) measurement using an STEM (scanning transmission electron microscopy), the Pt catalyst particles (hereinafter, inner particles) present inside the carbon support and the Pt catalyst particles (hereinafter, outer particles) present on the surface portion of the carbon support were separated, and the particle size distribution of the Pt catalyst in each region was calculated.

Figure 12:
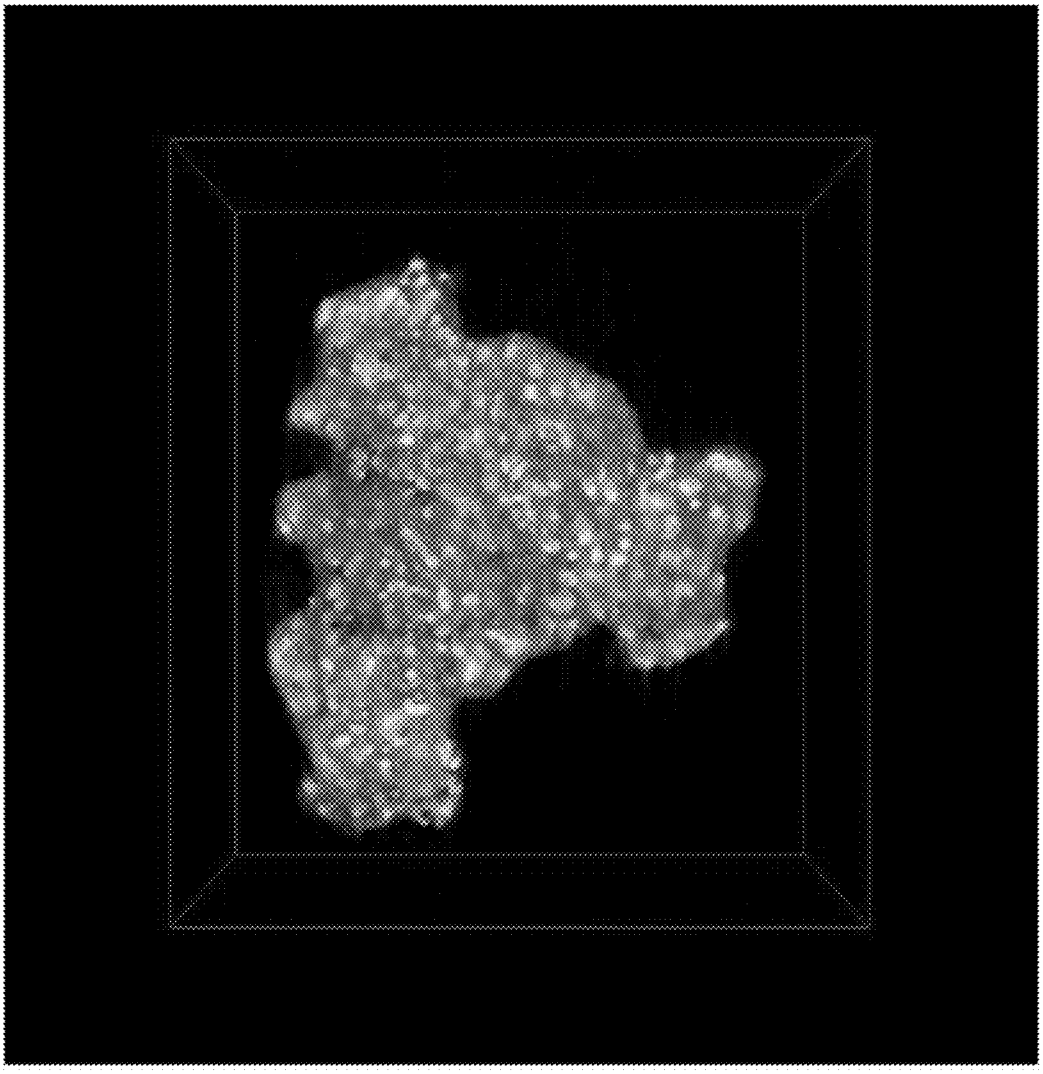
FIG. 12 A 3D-STEM image (three-dimensional reconstructed image) of the catalyst for electrode of Example 1.

A three-dimensional reconstructed image (3D-STEM image) of the Pt/C catalyst A is shown in FIG. 12.

Figure 14:
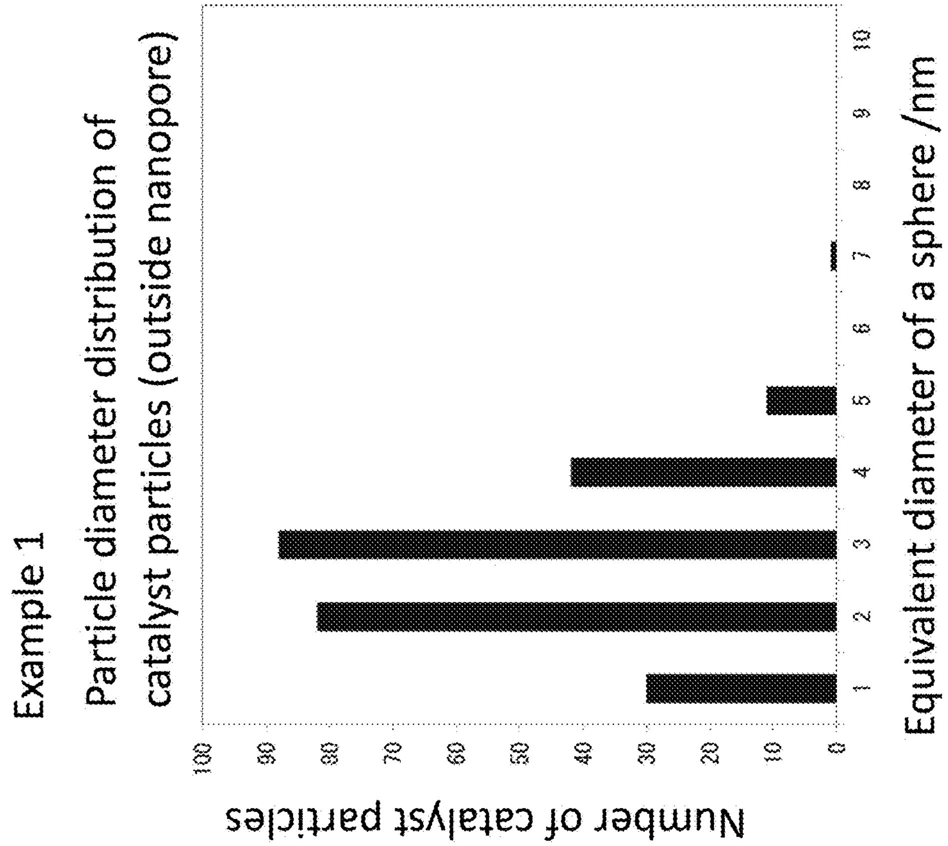
FIG. 14 A graph showing the particle size distribution (in the equivalent diameter of a sphere) of the catalyst particles supported outside the nanopores of the support among the catalyst particles obtained by image analysis of the 3D-STEM image of the catalyst of Example 1 shown in FIG. 12.
Figure 13:
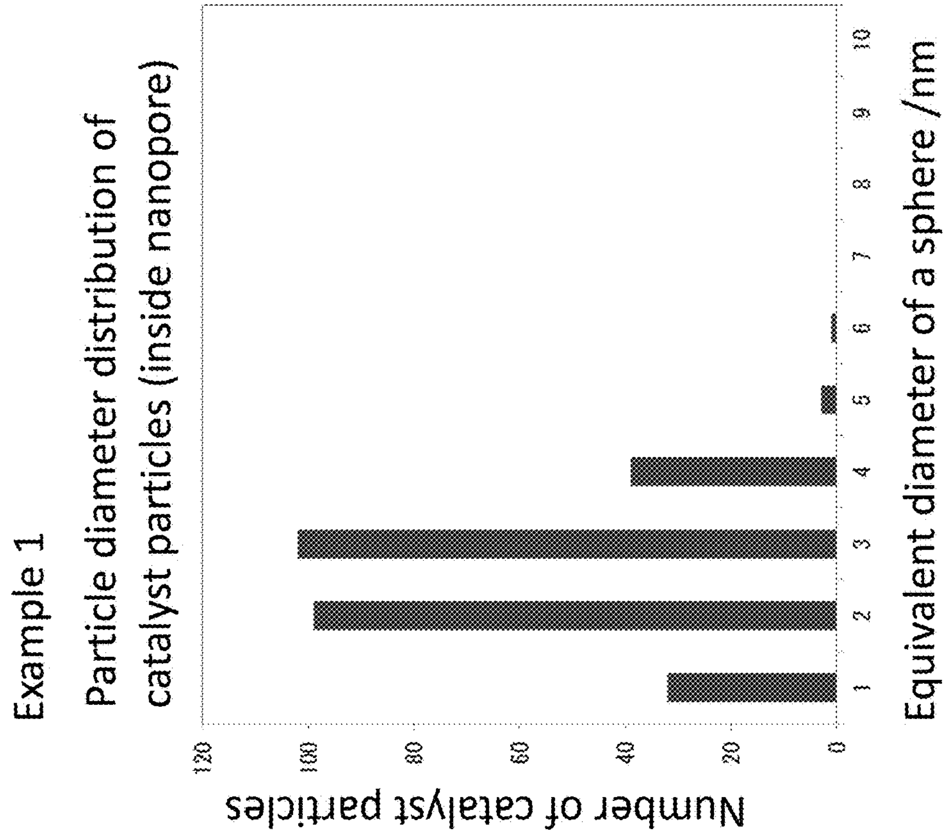
FIG. 13 A graph showing the particle size distribution (in the equivalent diameter of a sphere) of the catalyst particles supported inside the nanopores of the support among the catalyst particles obtained by image analysis of the 3D-STEM image of the catalyst of Example 1 shown in FIG. 12.

Among the catalyst particles obtained by image analysis, the particle size analysis results of the catalyst particles supported inside the nanopores of the support and the catalyst particles supported outside the nanopores (particle size distribution indicated by the equivalent sphere diameter) is shown in FIG. 13 and FIG. 14.

The 3D-STEM image was obtained by reconstructing a plurality of two-dimensional STEM images obtained by stepwise tilting the sample stage under the above measuring conditions.

Further, the image analysis (particle size analysis) of three-dimensional reconstructed image (3D-STEM image) was carried out by the following procedures. The regions of the catalytic particles were first selected from the three-dimensional reconstructed images, and the respective catalytic particles were labeled (not shown). Next, the volume of the labeled Pt catalyst particles was obtained, the diameter of a sphere having the same volume as this volume (the equivalent diameter of the sphere) was calculated, and the particle size distribution (FIG. 13 and FIG. 14) was obtained.

Here, the sphere equivalent diameter was calculated by rounding up the value below the decimal point (value below 1 nm) using the unit of nm.

For this Pt/C catalyst A, the ratio of the catalyst particles supported inside the nanopores of the support and the ratio of the catalyst particles supported outside the nanopores of the support were determined. The values of D10, D20, D1, D2, N1, and N2 were also obtained. The results are shown in Table 2 and Table 3.

Furthermore, the mean value of the particle size of the catalyst particles of the Pt/C catalyst A measured from the STEM image was 3.1 nm (the average value of the particle size of the catalyst particles inside the nanopores: 3.1 nm, the average value of the particle size of the catalyst particles outside the nanopores: 3.2 nm).

(2) Production of the Pt/C Catalyst to be Used for the Cathode of the MEA of Example 2

[Pt Catalyst Particle-Supported Carbon Catalyst "Pt/C Catalyst" Powder]

The powder {Pt loading ratio: 48.0 wt %, trade name "SA50BM-B237", manufactured by N.E. CHEMCAT} of the Pt/C catalyst used for the cathode of the MEA of Example 2 (hereinafter, referred to as "Pt/C catalyst B" if necessary) was prepared under the same conditions and procedures as the Pt/C catalyst A used for the cathode of the MEA of Example 1, except that a trial sample product "CNovel B" manufactured by Toyo Tanso Co., Ltd. as the porous carbon support (BET specific surface area: 800 $m^2/g$)" was used as a porous carbon support.

<Surface Observation/Structure Observation of Catalyst for Electrode>

In order to observe the three-dimensional structure of this Pt/C catalyst B of Example 2, in the same method and conditions as the Pt/C catalyst of Example 1, the electron tomography measurement was carried out by using the "USAL-KM3D analysis method" with the STEM (scanning transmission electron microscope) at UBE Scientific Analysis Center Co., Ltd.

Figure 15:
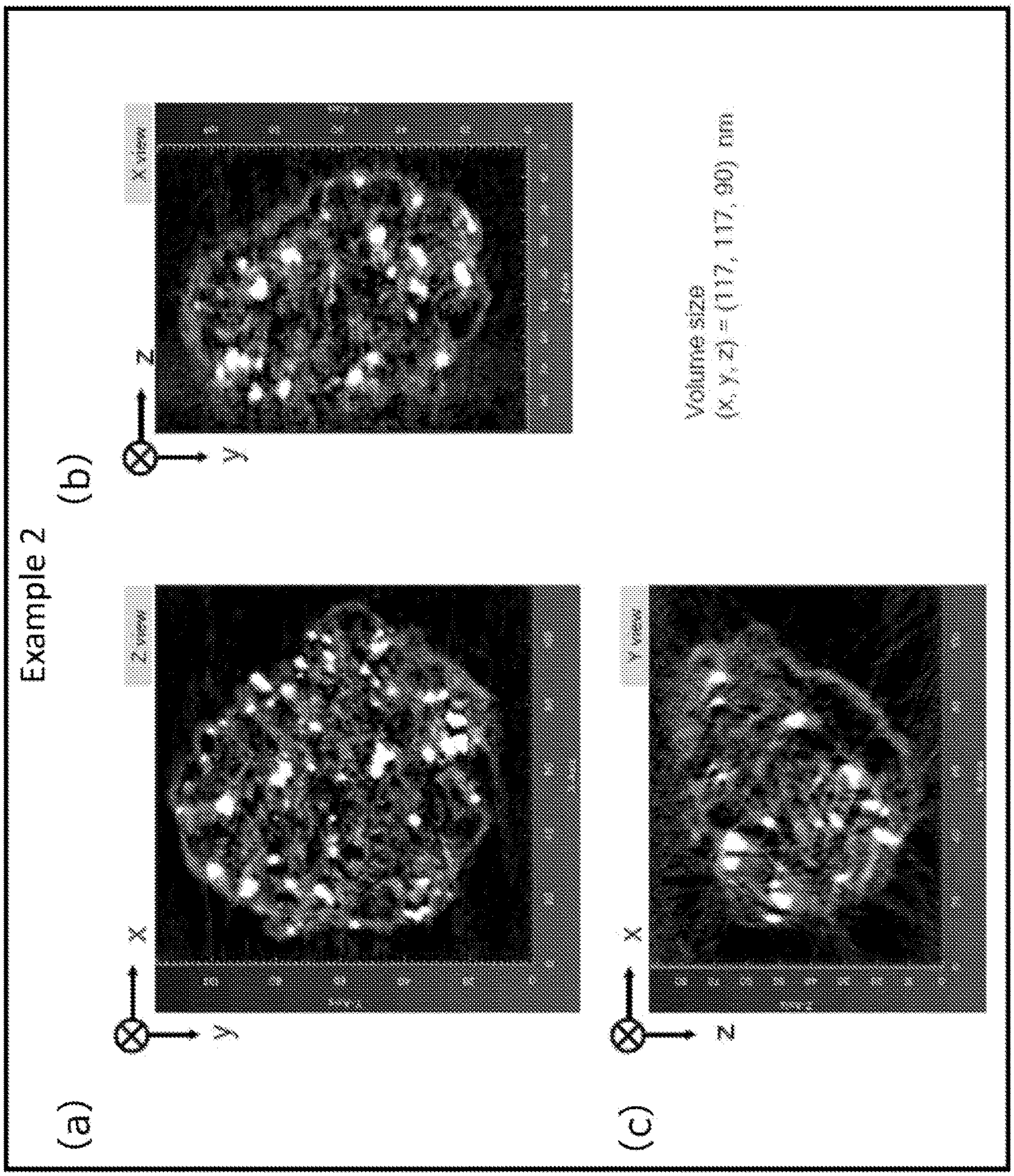
FIG. 15 An STEM image showing 3D-electron beam tomography (electron tomography) measurement conditions (volume size) using an STEM of the catalyst for electrode of Example 2.

FIG. 15 shows an STEM image showing 3D-electron beam tomography (electron tomography) measurement conditions (volume size) using an STEM of the catalyst for electrode (Pt/C catalyst B) of Example 2.

Figure 16:
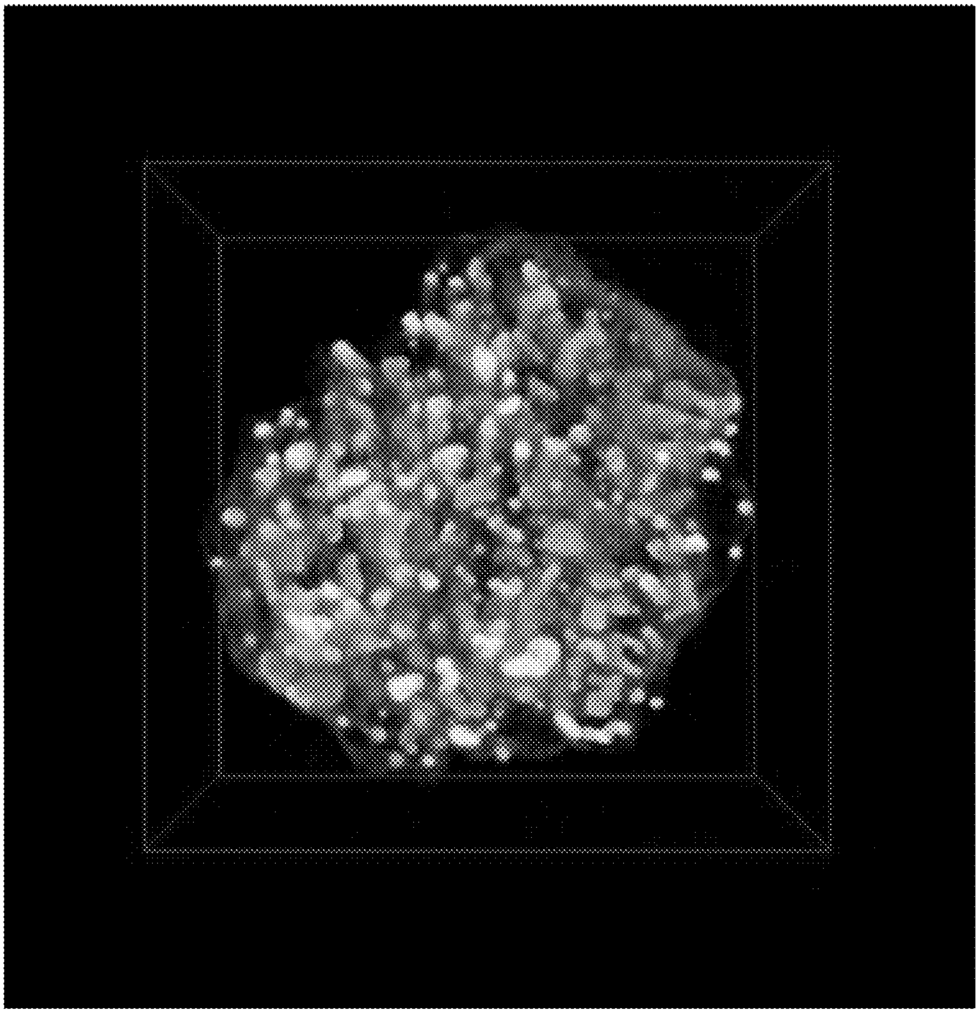
FIG. 16 A 3D-STEM image (three-dimensional reconstructed image) of the catalyst for electrode of Example 2.

FIG. 16 shows a 3D-STEM image (three-dimensional reconstructed image) of the catalyst for electrode (Pt/C catalyst B) of Example 2.

Figure 17:
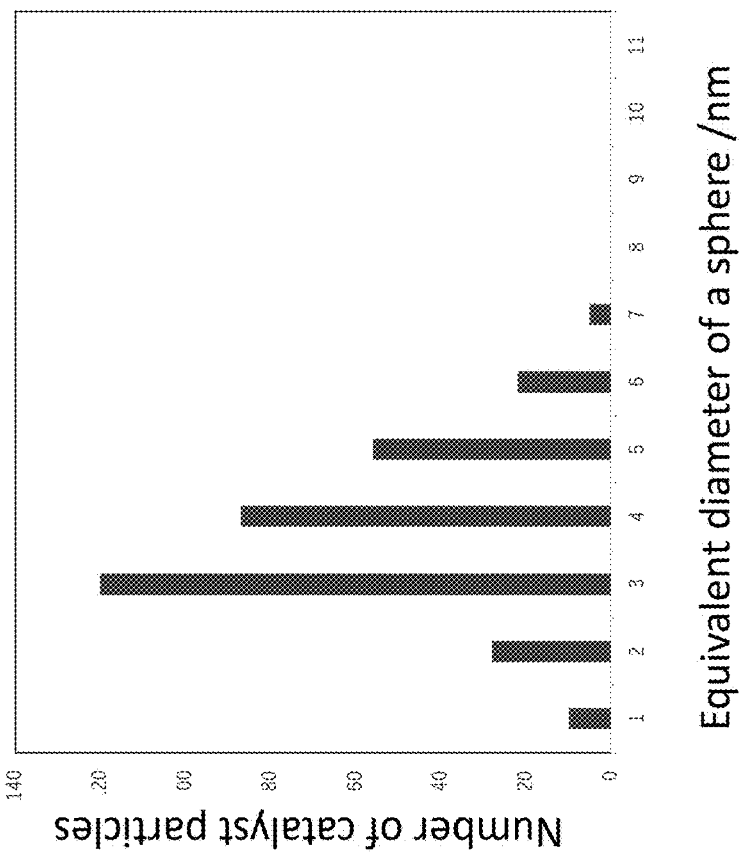
FIG. 17 A graph showing the particle size distribution (in the equivalent diameter of a sphere) of the catalyst particles supported inside the nanopores of the support among the catalyst particles obtained by image analysis of the 3D-STEM image of the catalyst of Example 2 shown in FIG. 16.

FIG. 17 shows a graph showing the particle size distribution (in the equivalent diameter of a sphere) of the catalyst particles supported inside the nanopores of the support among the catalyst particles obtained by image analysis of the 3D-STEM image of the catalyst for electrode (Pt/C catalyst B) of Example 2 shown in FIG. 16.

Figure 18:
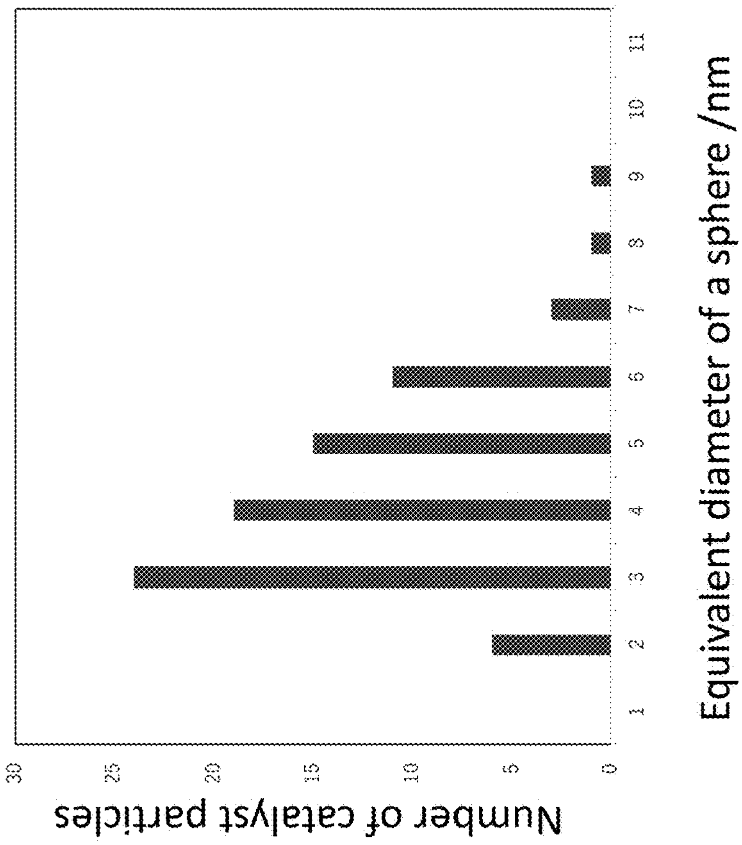
FIG. 18 A graph showing the particle size distribution (in the equivalent diameter of a sphere) of the catalyst particles supported outside the nanopores of the support among the catalyst particles obtained by image analysis of the 3D-STEM image of the catalyst of Example 2 shown in FIG. 16.

FIG. 18 shows a graph showing the particle size distribution (in the equivalent diameter of a sphere) of the catalyst particles supported outside the nanopores of the support among the catalyst particles obtained by image analysis of the 3D-STEM image of the catalyst for electrode (Pt/C catalyst B) of Example 2 shown in FIG. 16.

For this catalyst for electrode (Pt/C catalyst B), the ratio of the catalyst particles supported inside the nanopores of the support and the ratio of the catalyst particles supported outside the nanopores of the support were determined. The values of D10, D20, D1, D2, N1, and N2 were also obtained. The results are shown in Table 2 and Table 3.

Furthermore, the mean value of the particle size of the catalyst particle of the catalyst for electrode (Pt/C catalyst B) measured from the STEM image was 3.3 nm (the average value of the particle size of the catalyst particles inside the nanopores: 3.2 nm, the average value of the particle size of the catalyst particles outside the nanopores: 3.7 nm).

(3) Preparation of Pt/C Catalyst Powder Used for the Cathode of MEA of Comparative Example 1

As a Pt/C catalyst, a Pt/C catalyst manufactured by N.E. CHEMCAT with a Pt loading ratio of 50 wt % (trade name: "SA50BK") was prepared. As the support of this Pt/C catalyst, a commercially available porous carbon support (manufactured by Lion Co., Ltd., trade name "Carbon ECP" (registered trademark) (Ketjen Black EC300J), specific surface area of 750 to 800 $m^2/g$) was used.

<Surface Observation/Structure Observation of Catalyst for Electrode>

In order to observe the three-dimensional structure of this Pt/C catalyst of Comparative Example 1, in the same method and conditions as the Pt/C catalyst of Example 1, The electron tomography measurement was carried out by using the "USAL-KM3D analysis method" with the STEM (scanning transmission electron microscope) at UBE Scientific Analysis Center Co., Ltd.

Figure 19:
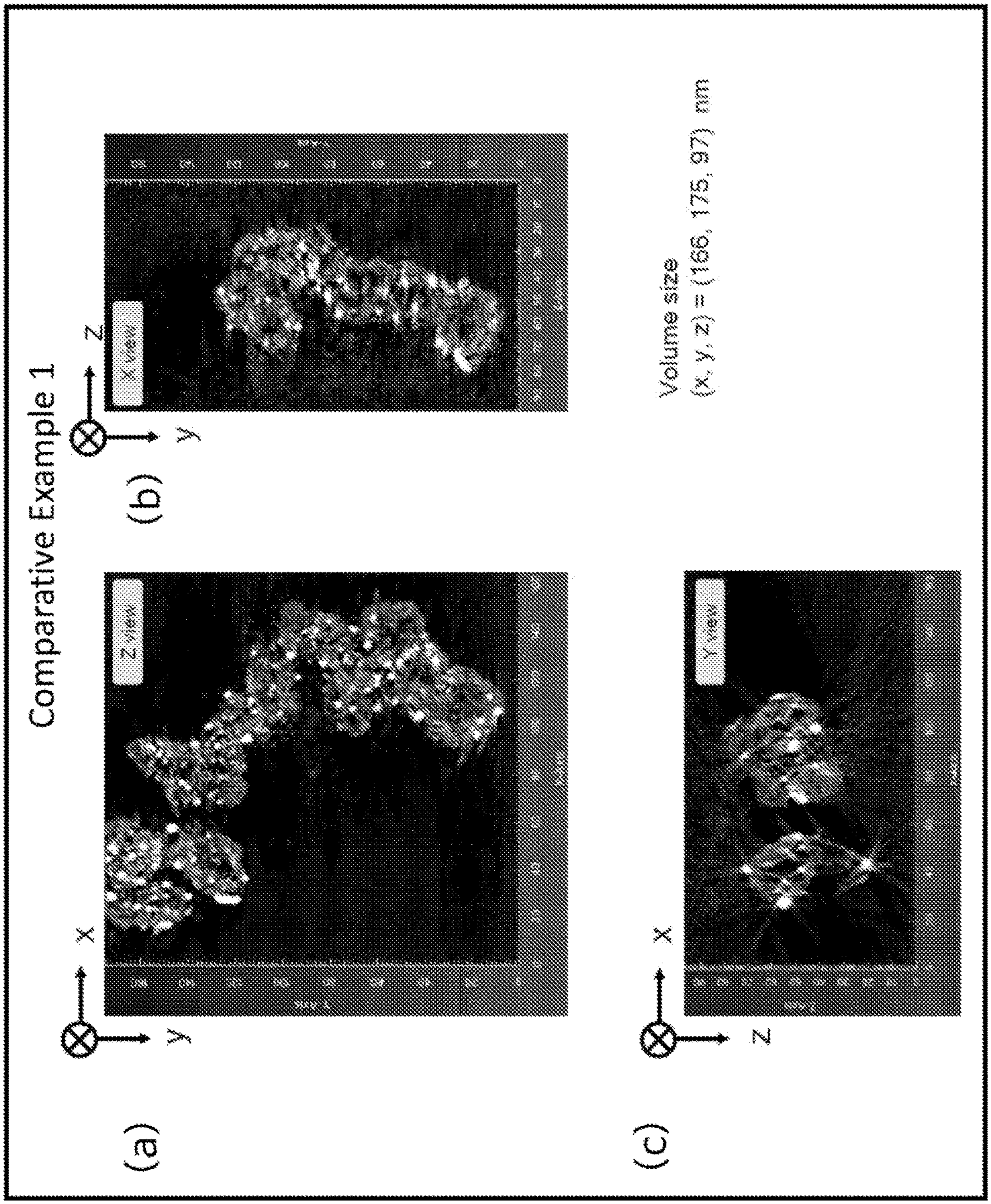
FIG. 19 An STEM image showing 3D-electron beam tomography (electron tomography) measurement conditions (volume size) using an STEM of the catalyst for electrode of Comparative Example 1.

FIG. 19 shows an STEM image showing 3D-electron beam tomography (electron tomography) measurement conditions (volume size) using an STEM of the Pt/C catalyst of Comparative Example 1.

Figure 20:
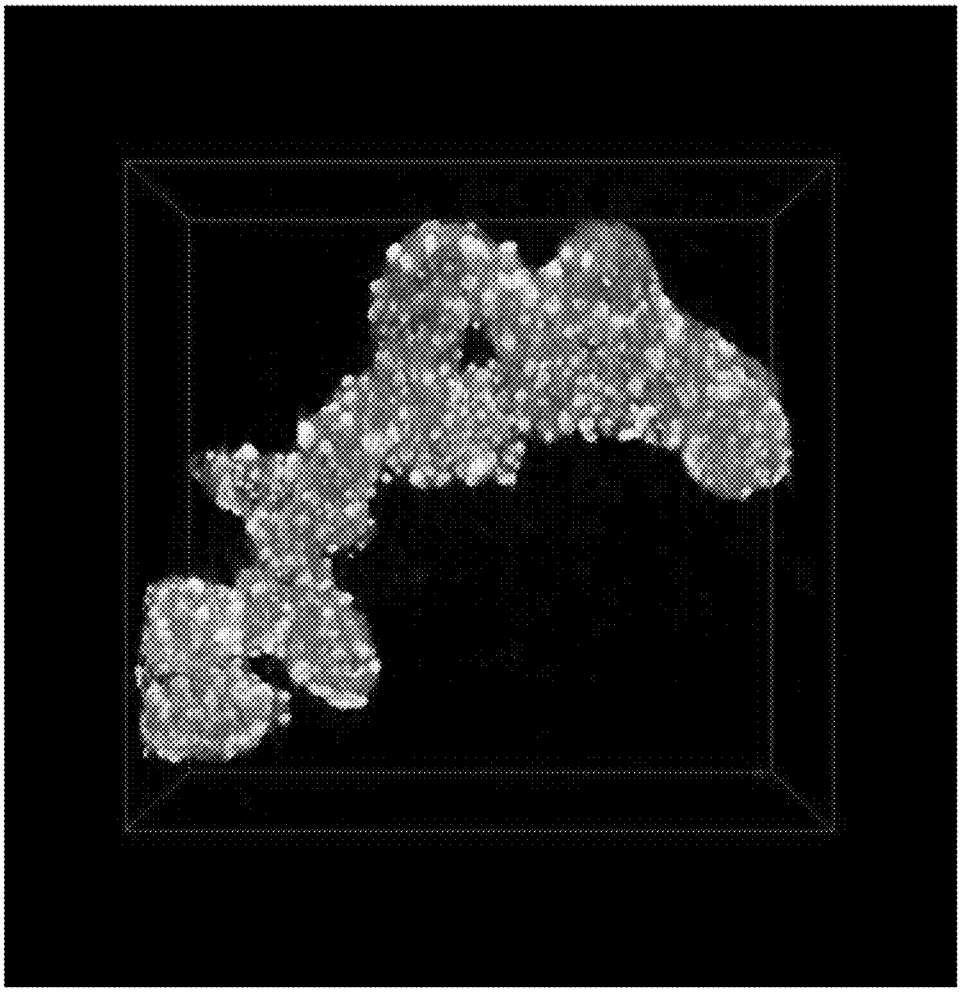
FIG. 20 A 3D-STEM image (three-dimensional reconstructed image) of the catalyst for electrode of Comparative Example 1.

FIG. 20 shows a 3D-STEM image (three-dimensional reconstructed image) of the Pt/C catalyst of Comparative Example 1.

Figure 21:
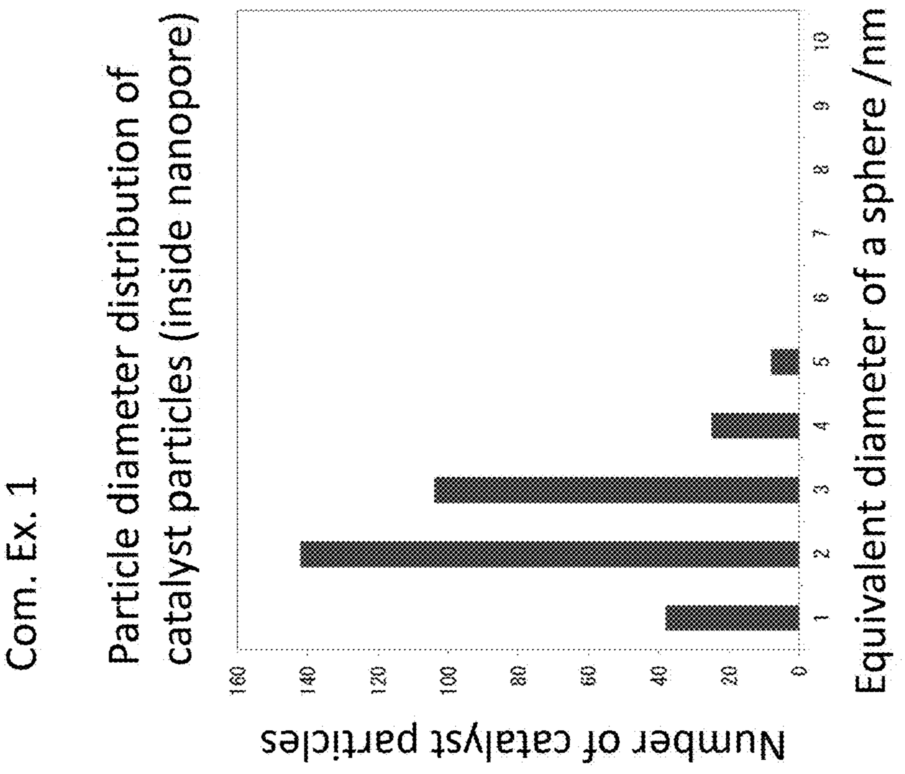
FIG. 21 A graph showing the particle size distribution (in the equivalent diameter of a sphere) of the catalyst particles supported inside the nanopores of the support among the catalyst particles obtained by image analysis of the 3D-STEM image of the catalyst for electrode of Comparative Example 1 shown in FIG. 20.

FIG. 21 shows a graph showing the particle size distribution (in the equivalent diameter of a sphere) of the catalyst particles supported inside the nanopores of the support among the catalyst particles obtained by image analysis of the 3D-STEM image of the Pt/C catalyst of Comparative Example 1 shown in FIG. 20.

Figure 22:
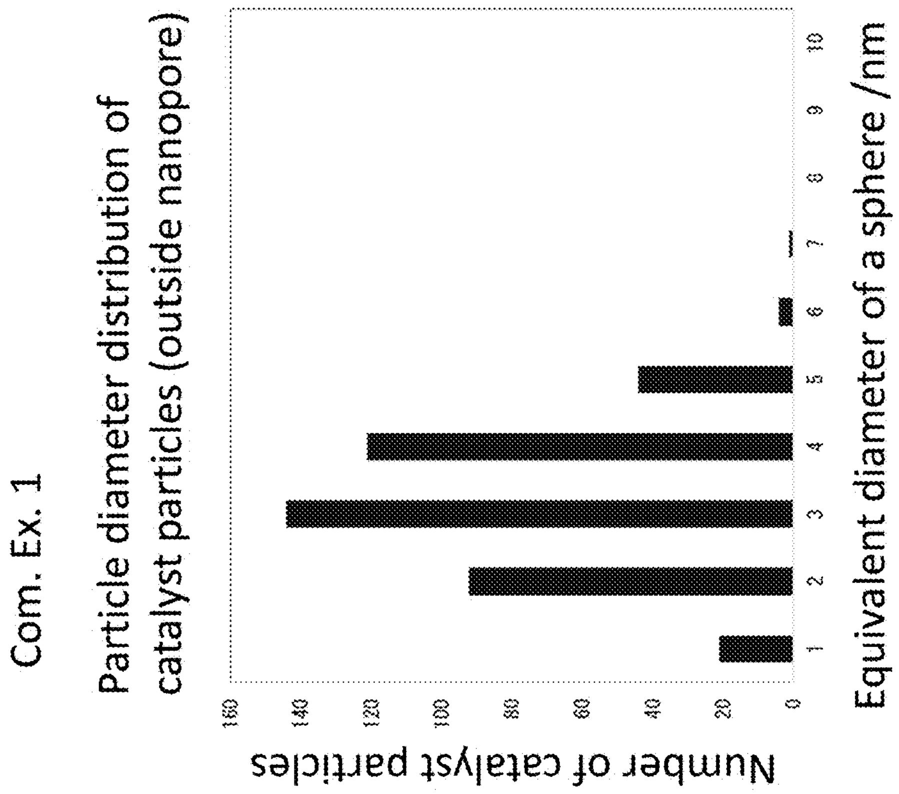
FIG. 22 A graph showing the particle size distribution (in the equivalent diameter of a sphere) of the catalyst particles supported outside the nanopores of the support among the catalyst particles obtained by image analysis of the 3D-STEM image of the catalyst for electrode of Comparative Example 1 shown in FIG. 20.

FIG. 22 shows a graph showing the particle size distribution (in the equivalent diameter of a sphere) of the catalyst particles supported outside the nanopores of the support among the catalyst particles obtained by image analysis of the 3D-STEM image of the Pt/C catalyst of Comparative Example 1 shown in FIG. 20.

For this Pt/C catalyst, the ratio of the catalyst particles supported inside the nanopores of the support and the ratio of the catalyst particles supported outside the nanopores of the support were determined. The values of D10, D20, D1, D2, N1, and N2 were also obtained. The results are shown in Table 2 and Table 3.

Furthermore, the mean value of the particle size of the catalyst particles of the Pt/C catalyst A measured from the STEM image was 3.1 nm (the average value of the particle size of the catalyst particles inside the nanopores: 3.1 nm, the average value of the particle size of the catalyst particles outside the nanopores: 3.2 nm).

(4) Production of the Pt/C Catalyst to be Used for the Cathode of the MEA of Comparative Example 2

[Pt Catalyst Particle-Supported Carbon Catalyst "Pt/C Catalyst" Powder]

The powder (Pt loading ratio: 48.0 wt %, trade name "SA50BM-B207", manufactured by N.E. CHEMCAT) of the Pt/C catalyst used for the cathode of the MEA of Example 2 (hereinafter, referred to as "Pt/C catalyst C", if necessary) was prepared under the same conditions and procedures as the Pt/C catalyst A used for the cathode of the MEA of Example 1, except that a trial sample product "CNovel C" manufactured by Toyo Tanso Co., Ltd. as the porous carbon support (BET specific surface area: 800 $m^2/g$)" was used as a porous carbon support.

<Surface Observation/Structure Observation of Catalyst for Electrode>

In order to observe the three-dimensional structure of this Pt/C catalyst C of Comparative Example 2, in the same method and conditions as the Pt/C catalyst of Example 1, the electron tomography measurement was carried out by using the "USAL-KM3D analysis method" with the STEM (scanning transmission electron microscope) at UBE Scientific Analysis Center Co., Ltd.

Though with respect to this catalyst for electrode (Pt/C catalyst C) of Comparative Example 2, the information of the measurement of electron beam tomography by using the STEM (scanning transmission electron microscope) and the analysis results thereof corresponding to those shown in FIG. 11 to FIG. 14, FIG. 15 to FIG. 17, and FIG. 20 to FIG. 22 were obtained as in Example 1 and Example 2 and Comparative Example 1, but the illustration is omitted.

Figure 23:
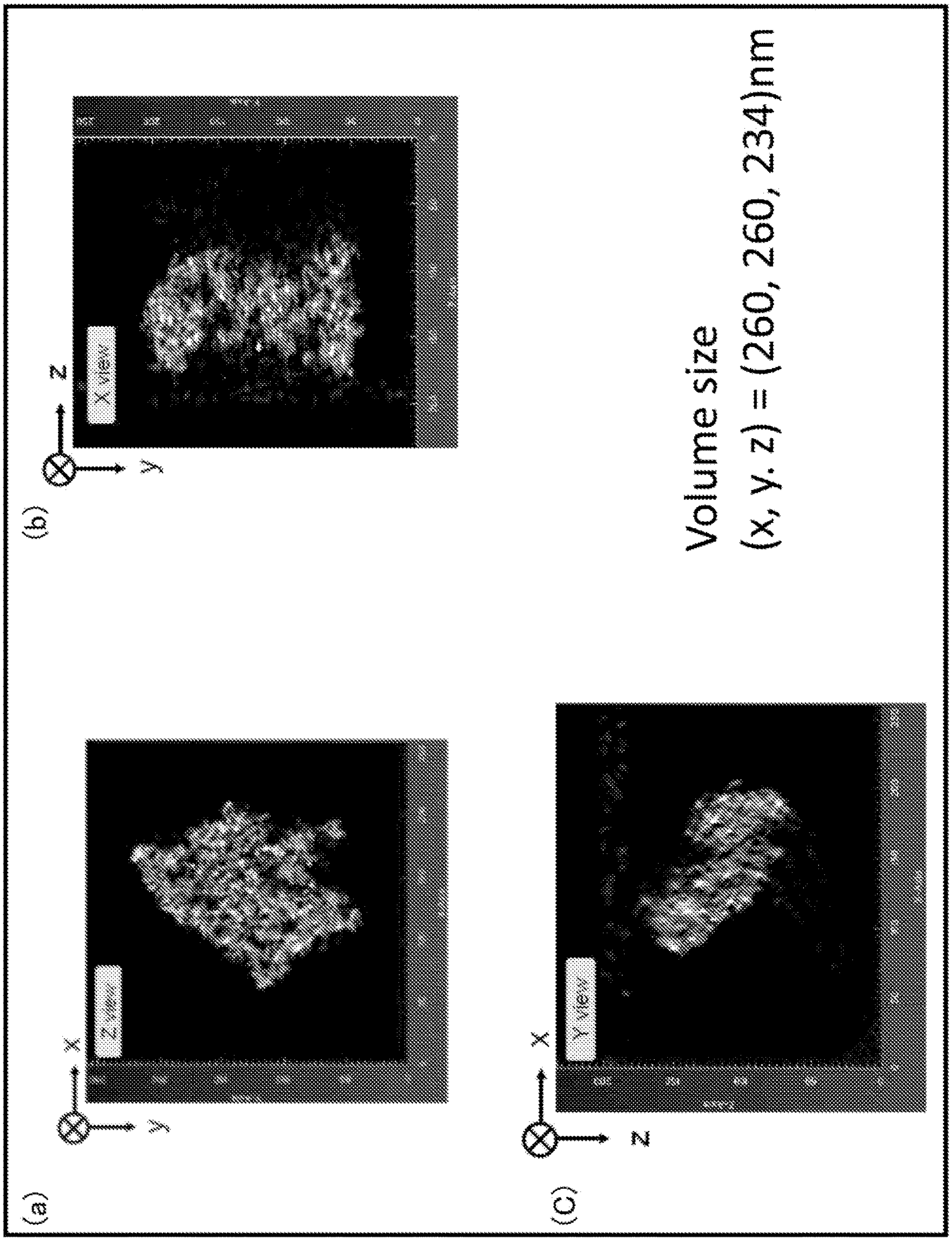
FIG. 23 An STEM image showing 3D-electron beam tomography (electron tomography) measurement conditions (volume size) using an STEM of the catalyst for electrode of Comparative Example 1.

FIG. 23 shows an STEM image showing 3D-electron beam tomography measurement conditions (volume size) using an STEM of the Pt/C catalyst of Comparative Example 2.

For this catalyst for electrode (Pt/C catalyst C) of Comparative Example 2, the ratio of the catalyst particles supported inside the nanopores of the support and the ratio of the catalyst particles supported outside the nanopores of the support were determined. The values of D10, D20, D1, D2, N1, and N2 were also obtained. The results are shown in Table 2 and Table 3.

Furthermore, the mean value of the particle size of the catalyst particles of the catalyst for electrode (Pt/C catalyst C) measured from the STEM image was 3.2 nm (the average value of the particle size of the catalyst particles inside the nanopores: 2.9 nm, the average value of the particle size of the catalyst particles outside the nanopores: 3.5 nm).

(5) Confirmation of the Microstructure of the Catalyst for Electrodes of Example 1, Example 2, Comparative Example 1 and Comparative Example 2 by Using the Three-Dimensional Reconstructed Image of STEM With respect to the catalyst for electrodes of Example 1, Example 2 and Comparative Example 2, in order to confirm "whether or not the nanopore is formed so as to have the shape of the interconnected pore according to the present invention", which is the aforementioned condition (8), the study by using the three-dimensional reconstructed image of STEM was performed. Further, the porosity of each catalyst was determined by using the three-dimensional reconstructed image of STEM.

The results are shown in FIG. 24 and FIG. 25.

As shown in FIG. 24(*c*) and FIG. 25, among six square cross sections of the stereoscopic image of the interior of the catalyst aggregate of the catalyst for electrode of Example 1, the nanopore P1 observed in the cross section of interest (x-y plane of the square) has two openings in contact with the first side L1 (opening A11 and opening A12). Further, the nanopore P1 has two openings (opening A21 and opening A22) in contact with the second side L2 which is parallel to the first side L1. Furthermore, the nanopore P1 has the shape of interconnected pore P1 that continuously extends from the openings (opening A11 and opening A12) on the first side L1 to the openings (opening A21 and opening A22) on the second side L2 without blocking.

Furthermore, as shown in FIG. 24(*c*) and FIG. 25, the nanopore P1 inside the catalyst for electrode of Example 1 has a shape having a plural of branches.

Furthermore, as shown in FIG. 24(*c*) and FIG. 25, the nanopore P1 inside the catalyst for electrode of Example 1 has two or more openings (opening A11 and opening A12) on the first side L1.

Further, as shown in FIG. 24(*c*) and FIG. 25, the nanopore P1 inside the catalyst for electrode of Example 1 has two or more openings (opening A21 and opening A22) on the second side L2.

Furthermore, as shown in FIG. 24(*c*) and FIG. 25, the nanopore P1 inside the catalyst for electrode of Example 1 has one opening (opening A31) on the third side L3 perpendicular to the first side L1.

Further, as shown in FIG. 24(*c*) and FIG. 25, the nanopore P1 inside the catalyst for electrode of Example 1 has two or more openings (opening A41 and opening A42) on the fourth side L4 perpendicular to the first side L1.

As shown in FIG. 24(*d*) and FIG. 24(*e*), with respect to the catalyst for electrode of Example 1, it was confirmed that the nanopore P1 had a shape similar to that described above in the other two planes (x-y plane, z-x plane) of the stereoscopic image inside the catalyst aggregate.

Furthermore, as shown in FIG. 24(*h*), FIG. 24(*i*) and FIG. 24(*j*), with respect to the catalyst for electrode of Example 2, it was confirmed that the nanopore P22 having the shape of the interconnected pore P1 according to the present invention was formed in the same manner as the catalyst for electrode of Example 1.

On the other hand, as shown in FIG. 24(*m*), FIG. 24(*n*) and FIG. 24(*o*), with respect to the catalyst for electrode of Comparative Example 1, it was confirmed that the nanopore P22 having the shape of the interconnected pore P1 according to the present invention was not formed. Though the nanopore P1 observed in the cross sections (x-y plane, y-z plane, z-x plane) of the stereoscopic image inside the catalyst aggregate of the catalyst for electrode of Comparative Example 1 had one opening in contact with the first side and one opening in contact with the second side parallel to the first side, it was confirmed that the opening did not have the shape of interconnected pore P1 that continuously extended from the openings on the first side to the opening on the second side without blocking.

(II) Preparation of P/C Catalysts Used for the Anodes of the MEA of Example 1, Example 2, Comparative Example 1 and Comparative Example 2

The same Pt/C catalyst as the Pt/C catalyst used for the cathode of the MEA of Comparative Example 1 was used as the P/C catalyst used in the anodes of the MEA of Example 1 and Example 2, Comparative Example 1 and Comparative Example 2.

Example 1

In the following procedures, an MEA with the same configuration as the MEA 10 shown in FIG. 1 was produced.

(1) Production of the Cathode

Cathode GDL

Carbon paper (trade name "TGP-H-60" manufactured by Toray Co., Ltd) was prepared as the GDL.

Ink for Forming Cathode MPL

Into a ball mill container made of Teflon (registered trademark) in which balls made of Teflon (registered trademark) were added, 1.5 g of carbon powder (trade name "Denkablack" manufactured by Electrochemical Industry Co., Ltd.), 1.1 g of ion-exchanged water, and 6.0 g of a surfactant (trade name "Triton" (35 wt % water solution) manufactured by Dow chemical Co., Ltd.) were charged and mixed.

Next, 1.75 g of polytetrafluoroethylene (PTFE) dispersion (trade name "31-JR" manufactured by Mitsui DuPont Fluorochemical Co., Ltd.) was put into the ball mill container and mixed. Thus, an ink for forming cathode MPL was produced.

Cathode MPL

On one side of the GDL, an ink for forming cathode MPL was applied using a barcoater to form a coating film. Thereafter, the coating film was sufficiently dried in a dryer, and further subjected to a heat and pressure bonding treatment to prepare a laminate in which the MPL was formed on the GDL.

Ink for Forming Cathode Catalyst Layer

Into a ball mill container made of Teflon (registered trademark) containing a ball made of Teflon (registered trademark), the above-mentioned Pt/C catalyst A, ion-exchanged water, a 10 wt % Nafion aqueous dispersion (trade name "DE1021CS" manufactured by DuPont Co., Ltd.) and glycerin were charged and mixed to prepare an ink for forming cathode catalyst layer. Note that this ink was adjusted to have a N/C=0.7. Further, the core-shell catalyst A was adjusted to have carbon: ion-exchanged water:glycerin=1:10:0.8 (mass ratio).

Cathode Catalyst Layer (CL)

An ink for forming cathode catalyst layer described above was applied to the surface of the MPL of a laminate in which MPL was formed on MPL on the GDL described above by a bar coating method to form a coating film. This coating film was dried at room temperature for 30 minutes, and then dried at 60° C. for 1.0 hours to obtain a catalyst layer. In this way, a cathode which is a gas diffusion electrode was prepared. Note that Pt supporting on catalyst layer of the cathode was set to be a numerical value shown in Table 1.

(2) Production of Anode

Anode GDL

As the GDL, carbon paper identical to that of the cathode was prepared.

Ink for Forming Cathode MPL

Into a ball mill container made of Teflon (registered trademark) in which balls made of Teflon (registered trademark) were added, 1.5 g of carbon powder (trade name "Denka black" manufactured by Electrochemical Industry Co., Ltd.), 1.0 g of ion-exchanged water, and 6.0 g of a surfactant (trade name "Triton" (35 wt % water solution) manufactured by Dow chemical Co., Ltd.) were charged and mixed.

Next, 2.5 g of a polytetrafluoroethylene (PTFE) dispersion (trade name "31-JR" manufactured by Mitsui DuPont Fluorochemical Co., Ltd.) was charged into the ball mill container and mixed. Thus, an ink for forming anode MPL was produced.

Anode MPL

The ink for forming anode MPL was applied to one side of the GDL using a barcoater to form a coating film. Thereafter, the coating film was sufficiently dried in a dryer, and further subjected to a heat and pressure bonding treatment to produce a laminate in which MPL was formed on the GDL.

Ink for Forming Anode Catalyst Layer

Into a ball mill container made of Teflon (registered trademark) in which balls made of Teflon (registered trademark) were added, SA50BK (Pt laoding ratio 50 wt %), ion-exchange water, 5 wt % Nafion alcohol dispersion (trade name "Nafion" 5 wt % dispersion, product number 274704, manufactured by SIGMA-ALDRICH's) and glycerin were charged and mixed to prepare an ink for forming anode catalyst layer. Note that this ink was adjusted to have N/C=1.2. Further, SA50BK was adjusted to have carbon: ion-exchanged water:glycerin=1:6:4 (mass ratio).

Anode Catalyst Layer (CL)

An ink for forming anode catalyst layer described above was applied to the surface of an MPL of a laminate in which MPL was formed on MPL on the GDL described above by a bar coating method to form a coating film. This coating film was dried at room temperature for 30 minutes, and then dried at 60° C. for 1.0 hours to obtain a catalyst layer. In this way, an anode which is a gas diffusion electrode was produced. Note that the Pt supporting amount of the catalyst layer of the anode was set as a 0.3 mg/cm$^2$.

(3) Production of MEA

A polymer electrolyte membrane (trade name "Nafion NR212" manufactured by DuPont Co., Ltd.) was prepared. Alaminate in which this polymer electrolyte membrane was arranged between the cathode and the anode was produced, and heated and pressed by a hot pressing machine to produce an MEA. Incidentally, the hot pressing was carried out with the conditions of 140° C. at 5 KN for 5 minutes and, further, 140° C. at 25 KN for 3 minutes.

Example 2

Each MEA was prepared under the same conditions and procedures as in Example 1, except that the following conditions were changed for the catalyst layer of the cathode.

That is, in preparing the ink for forming the catalyst layer of the cathode, the aforementioned Pt/C catalyst B was used instead of the Pt/C catalyst A.

Comparative Example 1

Each MEA was produced under the same conditions and procedures as in Example 1, except that the following conditions were changed with respect to the cathode catalyst layer.

That is, in the preparation of the ink for forming cathode catalyst layer, the previously described P/C catalyst (trade name: "SA-50BK") was used instead of the Pt/C catalyst A, a 5 wt % Nafion alcohol dispersion (trade name "DE520CS"; containing 48 wt % of 1-propanol manufactured by DuPont Co., Ltd.) was used instead of 10 wt % Nafion aqueous dispersion, the composition of the ink for forming cathode catalyst layer and the applying conditions of the ink were adjusted so that the Pt supported amount and the N/C had the numerical values shown in Table 1.

Next, the power generation reaction in the MEA was allowed to proceed under the following conditions.

The temperature of the unit cell (MEA) was set to 80° C. The anode was supplied with pure hydrogen humidified with saturated water vapor of 1.0 atm by adjusting the flow rate so that the utilization rate was 70%.

Further, the cathode was supplied with pure oxygen humidified with saturated water vapor of 1.0 atm at 80° C. by adjusting the flow rate so that the utilization rate was 50%.

Evaluation of the unit cells (MEA) was performed by controlling the current by an electronic supporting device attached to the fuel cell unit cell evaluation device, and the current-voltage curves obtained by scanning the current values from 0 to 1.0 A/cm$^2$ were acquired as data.

The X-axis (current density) from the data of the current-voltage curves was plotted as a logarithmic scale to obtain a graph (not shown), and a current density value at a voltage 850 mV (current value per unit area of the electrode) was obtained.

By dividing the current density value thus obtained by the platinum weight per unit area of the cathode, it was calculated as the activity per unit weight (Mass.Act.) for platinum contained in the cathode, and was used as an indicator of the oxygen reduction ability of the catalyst contained in the cathode. The results are shown in Table 1.

In Table 1, a result of comparing Mass.Act. obtained in the other examples as a relative value (relative ratio) using Mass.Act. obtained in Comparative Example 1 as a reference (1.0) is shown.

TABLE 1

| | Structure of catalyst for electrode of cathode | Carrier of catalyst for electrode of cathode | Ratio of catalyst particles supported inside nanopore of carrier of catalyst for electrode of cathode/% | Relative value of Mass. Act. @850 mV | Pt supporting amount of cathode g/cm2 | Pt supporting amount of anode g/cm2 | BET specific surface area of carrier m2/g | Porosity % |
|---|---|---|---|---|---|---|---|---|
| Ex. 1 | Pt/C | CNovel B | 52 | 1.8 | 0.10 | 0.30 | 1200 | 68 |
| Ex. 1 | Pt/C | CNovel A | 80 | 1.5 | 0.10 | 0.30 | 800 | 68 |
| Com. Ex. 1 | Pt/C | Carbon ECP | 43 | 1.0 | 0.10 | 0.30 | 800 | Not measured |
| Com. Ex. 2 | Pt/C | CNovel C | 46 | 1.1 | 0.10 | 0.30 | 1200 | 33 |

carbon:ion-exchanged water:glycerin=1:10:1 (mass ratio) in the P/C catalyst (trade name: "SA50BH").

Comparative Example 2

Each MEA was prepared under the same conditions and procedures as in Example 1, except that the following conditions were changed for the catalyst layer of the cathode.

That is, in preparing the ink for forming the catalyst layer of the cathode, the aforementioned Pt/C catalyst C was used instead of the Pt/C catalyst A.

<Cell Performance Evaluation>

The cell performance of the MEA of Example 1, Example 2, Comparative Example 1 and Comparative Example 2 was carried out by the following cell performance evaluation method.

The MEA of Example 1, Example 2, Comparative Example 1 and Comparative Example 2 were installed in a fuel cell unit cell evaluation device.

TABLE 2

| Cathode Observation results of 3D-STEM as to catalyst particle supported on electrode catalyst carrier | | | |
|---|---|---|---|
| | D10 Circle equivalent diameter/nm | D20 Circle equivalent diameter/nm | (D10/D20) |
| Ex. 1 | 3.1 | 3.2 | 0.97 |
| Ex. 2 | 3.2 | 3.7 | 0.86 |
| Com. Ex. 1 | 2.9 | 3.7 | 0.78 |
| Com. Ex. 2 | 2.9 | 3.5 | 0.83 |

TABLE 3

| Cathode Observation results of 3D-STEM as to catalyst particle supported on electrode catalyst carrier. | | | |
|---|---|---|---|
| | D1 Circle equivalent diameter/nm | D2 Circle equivalent diameter/nm | (N1/N2) |
| Ex. 1 | 3.0 | 3.0 | 1.2 |
| Ex. 2 | 3.0 | 3.0 | 5.0 |
| Com. Ex. 1 | 2.0 | 2.0 | 1.5 |
| Com. Ex. 2 | 3.0 | 3.0 | 1.1 |

From the results shown in Table 1 to Table 3, it was clarified that the MEA of Example 1 and Example 2 has a high Pt mass activity compared with the MEA of Comparative Example 1 and Comparative Example 2.

In the above, in the present examples and comparative examples, there have been studied the embodiments where the catalyst particle is the catalyst particle of the simplest Pt. However, the characteristics of the catalyst for electrode of the present invention is that, when the microstructure is observed by using a three-dimensional reconstructed image of STEM, the microstructure has the stereoscopic structure which satisfies the condition (a) that the ratio of the catalyst particles supported inside the nanopore is 50% or more (condition relating the supporting position of the catalyst particle which composes the catalyst for electrode) and the condition (8) that the nanopores are formed to have the shape of the interconnected pores described above (condition of microstructure of the nanopore of the support which composes the catalyst for electrode).

Therefore, it is clear that similar results can be obtained by changing the chemical constituents of the catalyst particles. That is, as long as the stereoscopic structure has the characteristics of the present invention, when a Pt alloy particle containing Pt or core-shell particle having a Pt shell layer is used as the catalyst particle in the same manner as the particle made of Pt, it is clear that the excellent Pt mass activity similar to that of the aforementioned examples can be realized.

INDUSTRIAL APPLICABILITY

The catalyst for electrode of the present invention exhibits excellent catalytic activity. In addition, the GDE, CCM, MEA, and fuel cell stack including the catalyst layer of the present invention exhibit excellent cell properties that can contribute to cost reduction of PEFC.

Therefore, the present invention can be applied not only to the electrical equipment industry such as a fuel cell, a fuel cell vehicle and a portable mobile but also to ENE-FARM, a cogeneration system and the like and, therefore, contributes to the development of energy industry and environmental technology.

EXPLANATION OF NUMERALS

1 . . . Cathode,
1A, 1B, 1C . . . Gas diffusion electrode (GDE)
1*c* . . . Catalytic layer (CL),
1*m* . . . Water repellent layer (MPL),
1*gd* . . . Gas diffusion layer (GDL),
2 . . . Anode,
2*c* . . . Catalytic layer (CL),
2*m* . . . Water repellent layer (MPL),
2*gd* . . . Gas diffusion layer (GDL),
3 . . . Polymer electrolyte membrane (PEM),
4, 5 . . . Separator
10, 11 . . . Membrane-electrode assembly (MEA),
12, 13 . . . Membrane catalyst layer assembly (CCM)
20 . . . Pt/C catalyst,
22 . . . Support,
23 . . . Catalyst particle,
25 . . . Non-contact particle,
30 . . . Fuel cell stack,
P1 . . . Interconnected pore P1 where a plural of nanopores P22 is connected
P22 . . . Nanopores of the support
P24 . . . Micropores of the support

The invention claimed is:

1. A catalyst for an electrode comprising a conductive porous carbon support having nanopores each having a pore size of 1 to 20 nm and micropores each having a pore size of less than 1 nm, and a plurality of catalyst particles supported on the support, wherein a region made of Pt (0 valence) is formed on at least a part of a surface of each catalyst particle, wherein the catalyst particles are supported both inside the nanopores and outside the nanopores of the support, wherein a ratio, by number, of the catalyst particles supported inside the nanopores to a total number of the catalyst particles is 50% or more, wherein the nanopores comprise at least one interconnected nanopore that is an open, continuous pore extending between two opposite, parallel sides of a square cross-section taken within an interior region of a catalyst aggregate, the square cross-section having a side length of 20 to 50 nm and the catalyst aggregate being accommodated in a rectangular space with one side of 60 to 300 nm, the at least one interconnected nanopore having at least one opening on each of said two opposite, parallel sides and extending continuously between the openings without blocking.

2. The catalyst for the electrode according to claim 1, wherein the at least one interconnected nanopore has a shape having a plurality of branches.

3. The catalyst for the electrode according to claim 2, wherein the square cross-section has a first side, a second side, a third side, and a fourth side, wherein the at least one interconnected nanopore has two or more openings on the first side.

4. The catalyst for the electrode according to claim 3, wherein the at least one interconnected nanopore has two or more openings on the second side.

5. The catalyst for the electrode according to claim 4, wherein the at least one interconnected nanopore has at least one opening on the third side perpendicular to the first side.

6. The catalyst for the electrode according to claim 5, wherein the at least one interconnected nanopore has at least one opening on the fourth side perpendicular to the first side.

7. The catalyst for the electrode according to claim 1, wherein a porosity is 35% or more.

8. The catalyst for the electrode according to claim 1, wherein a pore size of the nanopores is 1 to 10 nm.

9. The catalyst for the electrode according to claim 1, wherein the catalyst particles are made of Pt (0 valence).

10. The catalyst for the electrode according to claim 1, wherein the catalyst particles are made of a Pt alloy.

11. The catalyst for the electrode according to claim 1, wherein each catalyst particle is a core-shell catalyst particle, and each core-shell catalyst particle has a core particle, and a Pt shell layer corresponding to a region composed of Pt (0 valence) formed on at least a part of a surface of the core particle.

12. The catalyst for the electrode according to claim 1, which satisfies a condition of the following equation (1);

$$(D10/D20) \geq 0.80 \tag{1}$$

wherein, in the above equation (1),

D10 indicates an arithmetic mean value of a sphere-equivalent diameter of the catalyst particles supported on the inside of the nanopores of the support, D20 indicates the arithmetic mean value of the sphere-equivalent diameter of the catalyst particles supported on the outside of the nanopores of the support.

13. The catalyst for the electrode according to claim 1, which further satisfies the condition of the following equation (2) and the equation (3) in addition to the condition of the equation (1), $$D1 \leq D2 \tag{2}$$

$$(N1/N2) > 2.0 \tag{3}$$

wherein, in the equation (2) and the equation (3),

D1 indicates a sphere equivalent diameter of particles exhibiting a maximum frequency among the catalyst particles supported inside the nanopores of the support, D2 indicates a sphere equivalent diameter of particles exhibiting a maximum frequency among the catalyst particles supported outside the nanopores of the support, N1 indicates a frequency of particles exhibiting a maximum frequency among the catalyst particles supported inside the nanopores of the support, N2 indicates a frequency of particles exhibiting a maximum frequency among the catalyst particles supported outside the nanopores of the support.

14. The catalyst for the electrode according to claim 1, wherein at least a part of the region composed of the Pt (0 valence) on a surface of each catalyst particle is covered with a Pt oxide film.

15. The catalyst for the electrode according to claim 1, wherein a BET specific surface area (nitrogen adsorption specific surface area) of the porous carbon support is 200 to 1500 $m^2/g$.

16. A powder of a catalyst for the electrode, which contains 10 wt % or more of the catalyst for electrode according to claim 1.

17. A composition for forming gas diffusion electrode, which comprises the catalyst for the electrode according to claim 1.

18. A gas diffusion electrode, which comprises the catalyst for the electrode according to claim 1.

19. A membrane-electrode assembly (MEA), which comprises the gas diffusion electrode according to claim 18.

20. A fuel cell stack, which comprises the membrane-electrode assembly (MEA) of claim 19.

* * * * *